(12) United States Patent
Hato et al.

(10) Patent No.: US 9,630,169 B2
(45) Date of Patent: Apr. 25, 2017

(54) SEMICONDUCTOR MATERIAL, OPTICAL HYDROGEN GENERATING DEVICE USING SAME, AND METHOD OF PRODUCING HYDROGEN

(75) Inventors: Kazuhito Hato, Osaka (JP); Kenichi Tokuhiro, Osaka (JP); Takahiro Suzuki, Osaka (JP); Takaiki Nomura, Osaka (JP); Kenichiro Ota, Tokyo (JP); Akimitsu Ishihara, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 325 days.

(21) Appl. No.: 14/342,489

(22) PCT Filed: Aug. 31, 2012

(86) PCT No.: PCT/JP2012/005526
§ 371 (c)(1),
(2), (4) Date: Mar. 3, 2014

(87) PCT Pub. No.: WO2013/035291
PCT Pub. Date: Mar. 14, 2013

(65) Prior Publication Data
US 2014/0224665 A1    Aug. 14, 2014

(30) Foreign Application Priority Data

Sep. 6, 2011    (JP) .................... 2011-193903

(51) Int. Cl.
*B01J 27/24*     (2006.01)
*B01J 19/12*     (2006.01)
(Continued)

(52) U.S. Cl.
CPC ............. *B01J 27/24* (2013.01); *B01J 19/127* (2013.01); *B01J 35/004* (2013.01); *B01J 37/347* (2013.01);
(Continued)

(58) Field of Classification Search
None
See application file for complete search history.

(56) References Cited

U.S. PATENT DOCUMENTS 5,444,173 A * 8/1995 Oyama .................. B01J 27/24
                                                            208/112
6,878,666 B2   4/2005 Domen et al.
(Continued)

FOREIGN PATENT DOCUMENTS

CN    1695784    11/2005
CN    1931426     3/2007
(Continued)

OTHER PUBLICATIONS

Sakuri et al.; Carbon-Supported Hafnium Oxynitride as Cathod Catalyst for Polymer Electrolyte Membrane Fuel Cells; Electrochima Acta; 4581-4588; 2011.*
(Continued)

*Primary Examiner* — Guinever S Gregorio
(74) *Attorney, Agent, or Firm* — Hamre, Schumann, Mueller & Larson, P.C.

(57) ABSTRACT

A semiconductor material of the present invention is a semiconductor material including an oxynitride containing at least one element selected from the Group 4 elements and Group 5 elements. In the oxynitride, part of at least one selected from oxygen and nitrogen is substituted with carbon. Nb is preferable as the Group 5 element.

4 Claims, 13 Drawing Sheets

Estimated value: 2690nm

(51) Int. Cl.
*B01J 37/34* (2006.01)
*B01J 35/00* (2006.01)
*C01B 3/04* (2006.01)
*C25B 1/00* (2006.01)
*C25B 1/04* (2006.01)
*C25B 9/00* (2006.01)
*C25B 9/06* (2006.01)

(52) U.S. Cl.
CPC .............. *C01B 3/042* (2013.01); *C25B 1/003* (2013.01); *C25B 1/04* (2013.01); *C25B 9/00* (2013.01); *C25B 9/06* (2013.01); *Y02E 60/364* (2013.01); *Y02E 60/366* (2013.01)

(56) References Cited

U.S. PATENT DOCUMENTS

| | | | | |
|---|---|---|---|---|
| 7,892,596 | B2* | 2/2011 | Angelopoulos | H01M 8/0204 502/185 |
| 2012/0003548 | A1 | 1/2012 | Shishikura | |
| 2012/0065052 | A1* | 3/2012 | Ewald | B01J 27/22 502/5 |
| 2012/0070763 | A1* | 3/2012 | Monden | B01J 27/22 429/480 |
| 2012/0094207 | A1* | 4/2012 | Wakizaka | H01M 4/9016 429/482 |
| 2012/0237842 | A1* | 9/2012 | Suzuki | C01G 33/00 429/423 |

FOREIGN PATENT DOCUMENTS

| | | |
|---|---|---|
| JP | 51-123779 | 10/1976 |
| JP | 58-020701 | 7/1983 |
| JP | 2003-024764 | 1/2003 |
| JP | 4107792 B2 | 4/2008 |
| JP | 2008-108594 | 5/2008 |
| JP | 2011-183358 | 9/2011 |
| JP | 2011183358 A * | 9/2011 |
| JP | 2012-115753 | 6/2012 |
| WO | 2010/107028 | 9/2010 |

OTHER PUBLICATIONS

Translation of JP2011183358; Sep. 24, 2016.*
Ishihara, et al., "Fundamental Studies on Cathode Catalyst for PEFC (X) Group 4 and 5 metal oxide-based compounds as non-precious cathode", The 18$^{th}$ FCDIC Fuel Cell Symposium Proceedings, pp. 53-56, 2011—Abstract.
Yu, et al., "A Simple Way to Prepare C—N-Codoped $TiO_2$ Photocatalyst with Visible-Light Activity", Catalysis Letters, vol. 129, No. 3/4, pp. 462-470, 2009.
Hara, et al., "Thin film catalysts based on group 4 and 5 transition metal oxide as cathode for PEFC", Abstracts of 78th Meeting of the Electrochemical Society of Japan (Spring 2011),The Electrochemical Society of Japan, Mar. 29, 2011, p. 43, 3A28,—with a full translation.
Gau, et al., "Metal-organic chemical vapor deposition of $Nb_xTa_{(1-x)}N_yO_mC_n$ films as diffusion barriers for Cu metallization", Thin Solid Films, vol. 420-421, 2002, pp. 548-552.
Office Action issued in corresponding Chinese Patent Application No. 201280043179.8, Feb. 27, 2015, 17 pages—with an English translation.

* cited by examiner

Actual measured value : 500nm

Estimated value : 810nm

Estimated value : 550nm

Estimated value : 630nm

Actual measured value : 600nm

Estimated value : 1270nm

Estimated value : 680nm

Estimated value : Conductive material

Actual measured value : 600nm

Estimated value : 1690nm

Estimated value : Conductive material

Estimated value : Conductive material

Estimated value : 810nm

Estimated value : 1040nm

Actual measured value : 600nm

Estimated value : 740nm

Estimated value : 710nm

Estimated value : 680nm

Estimated value : 700nm

Estimated value : 720nm

Actual measured value : 600nm

Estimated value : 1120nm

Estimated value : 2690nm

Estimated value: Conductive material

Estimated value : 970nm

Estimated value : 940nm

SEMICONDUCTOR MATERIAL, OPTICAL HYDROGEN GENERATING DEVICE USING SAME, AND METHOD OF PRODUCING HYDROGEN

TECHNICAL FIELD

The present invention relates to a semiconductor material having a photocatalytic ability suitable for water decomposition by light irradiation and to an optical hydrogen generating device using the semiconductor material. The present invention also relates to a method of producing hydrogen using the semiconductor material.

BACKGROUND ART

It is conventional to decompose water and collect hydrogen and oxygen by irradiating a semiconductor material functioning as a photocatalyst with light.

For example, Patent Literature 1 discloses a method in which a n-type semiconductor electrode and a counter electrode are disposed in an electrolyte solution, and the surface of the n-type semiconductor electrode is irradiated with light to collect hydrogen and oxygen from the surfaces of the two electrodes. Patent Literature 1 describes using a $TiO_2$ electrode, a ZnO electrode, a CdS electrode or the like as the n-type semiconductor electrode.

Patent Literature 2 discloses a gas generator including a metal electrode and a nitride semiconductor electrode that are connected together, the two electrodes being placed in a solvent. A nitride of a Group 13 element such as indium, gallium, or aluminum is used for the nitride semiconductor electrode.

Such conventional semiconductor electrodes have a problem of low hydrogen generation efficiency in water decomposition reaction induced by irradiation with sunlight. This is because the wavelength of light absorbable by the semiconductor materials such as $TiO_2$ and ZnO is short; that is, these semiconductor materials can only absorb light having a wavelength of approximately 400 nm or less, so that the proportion of utilizable light in the total sunlight is very small and about 4.7% in the case of $TiO_2$. Furthermore, considering a loss of absorbed light due to a theoretical heat loss, the utilization efficiency of sunlight is about 1.7%.

TaON, $Ta_3N_5$, and $Ag_3VO_4$ have been reported as semiconductor materials that can absorb longer-wavelength visible light. However, even for these semiconductor materials, the wavelength of absorbable light is at most about 500 to 600 nm. In the case of TaON capable of absorbing light having a wavelength of 500 nm or less, the proportion of utilizable light in the total sunlight is about 19%. However, considering a theoretical heat loss, the utilization efficiency is no more than about 8%.

Meanwhile, Patent Literature 3 has recently reported that $LaTaON_2$ is capable of absorbing visible light having a wavelength of up to 650 nm. This means that $LaTaON_2$ is capable of absorbing the longest wavelength light among the semiconductor materials that have been hitherto reported to be capable of decomposing water. In the case of $LaTaON_2$ capable of absorbing light having a wavelength of 650 nm or less, the proportion of utilizable light in the total sunlight is about 41%. However, considering a theoretical heat loss, the utilization efficiency is no more than about 20%.

Compound semiconductor materials containing Se, Te, or the like, and particular sulfides (such as CdS, ZnS, $Ga_2S_2$, $In_2S_3$, $ZnIn_2S_4$, ZnTe, ZnSe, $CuAlSe_2$, and $CuInS_2$), are also capable of absorbing light having a relatively long wavelength. However, these materials are poor in stability in water and are impractical for water decomposition reaction.

Patent Literature 4 discloses using a Group 5 element-containing carbonitride as an electrode active material for an oxygen-reduction electrode used as a positive electrode of a solid polymer fuel cell. However, Patent Literature 4 does not disclose the technical idea of using a Group 5 element-containing carbonitride as a semiconductor material functioning as a photocatalyst (photocatalytic material). In addition, the carbonitride of Patent Literature 4 is a mixture of a carbonitride with an oxide or the like, and is used in a different form from a photocatalytic material which is generally used in the form of a single-phase highly-crystalline material in view of quantum efficiency.

CITATION LIST

Patent Literature

Patent Literature 1: JP 551(1976)-123779 A
Patent Literature 2: JP 2003-24764 A
Patent Literature 3: JP 4107792 B
Patent Literature 4: JP 2008-108594 A

SUMMARY OF INVENTION

Technical Problem

In order for water to be decomposed by irradiation of a semiconductor material with light, the oxidation-reduction potentials of water (the hydrogen evolution level and the oxygen evolution level) need to lie between the band edges (the level of the top of the valence band and the level of the bottom of the conduction band) of the semiconductor material. Therefore, the requirements for the semiconductor material that can be practically used for water decomposition are that the semiconductor material be capable of absorbing light in a wide wavelength region (have a small band gap), have band edges between which the oxidation-reduction potentials of water lie, and remain stable in water under light irradiation. However, any semiconductor material that meets all the requirements has not been discovered thus far.

The following will discuss how small the band gap needs to be in order to achieve hydrogen generation efficiency comparable to that achieved in Si solar cells which are commonly known in the present time. Assuming a semiconductor material capable of absorbing light having a wavelength of 700 nm or less, then the proportion of utilizable light in the total sunlight is about 48%. Considering a theoretical loss due to a heat loss, the hydrogen generation efficiency is about 25%. This value is based on the assumption of a quantum efficiency of 100%. Therefore, when the semiconductor is used for a device, the following losses need to be further taken into consideration: a loss corresponding to a decrease in quantum efficiency; a loss due to reflection and scattering at a glass surface; and a loss due to light absorption by water. Considering the efficiencies in terms of the losses (quantum efficiency: 90%, efficiency depending on device design factors such as reflection and scattering: 90%), it can be estimated that hydrogen generation efficiency of up to about 20% is achieved in the case of a semiconductor material having a band gap corresponding to an absorption edge wavelength of 700 nm. When the hydrogen generation efficiency is low, the installation area required for generating a necessary amount of hydrogen naturally increases, thus leading to an increase in cost. In addition, it becomes difficult to install the device, for example, on a limited-area roof of a single-family house in a similar manner to that for solar cells. The power generation efficiency assumed to be achievable by simple-type Si solar cells (not of the tandem type) is about 20%. Therefore, in order to obtain the same or higher level of efficiency than that achieved by solar cells, a semiconductor material having a band gap corresponding to an absorption edge wavelength of 700 nm or more is needed. Furthermore, semiconductor materials that have a smaller band gap (corresponding to an absorption edge wavelength of 1008 nm or more) are incapable of decomposing water in principle since the water decomposition potential is about 1.23 V at ordinary temperature. Therefore, it is desired to discover a semiconductor material having a band gap corresponding to an absorption edge wavelength ranging between 700 nm and 1008 nm (1.23 eV and 1.77 eV).

It is therefore an object of the present invention to provide a semiconductor material that has a band gap corresponding to an absorption edge wavelength of 1008 nm or less and that has the longest possible bandgap wavelength.

Solution to Problem

The present invention provides a semiconductor material including an oxynitride containing at least one element selected from Group 4 elements and Group 5 elements. In the oxynitride, part of at least one selected from oxygen and nitrogen is substituted with carbon.

Advantageous Effects of Invention

The present invention can provide a semiconductor material that has a band gap corresponding to an absorption edge wavelength of 1008 nm or less and that has the longest possible bandgap wavelength.

DESCRIPTION OF EMBODIMENTS

Figure 1:
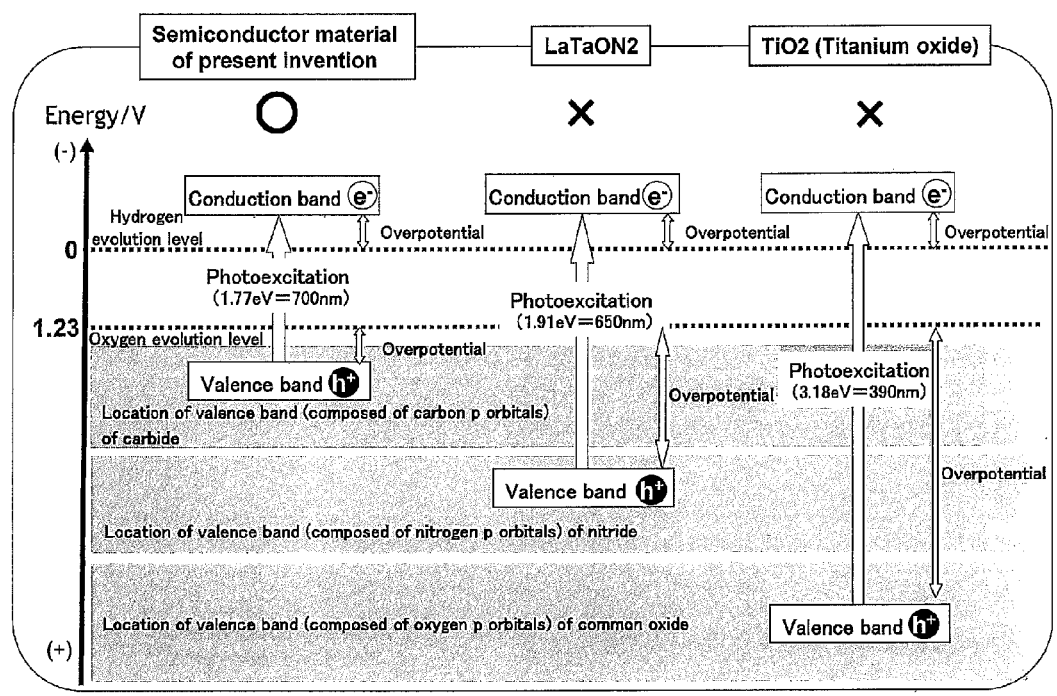
FIG. 1 is a conceptual diagram of the energy levels of a semiconductor material of an embodiment of the present invention and a conventional photocatalytic material.

The present inventors have succeeded in providing a novel semiconductor material that has a band gap corresponding to an absorption edge wavelength of 1008 nm or less and that has the longest possible bandgap wavelength, the semiconductor material capable of remaining stable in water under light irradiation. Furthermore, using such a novel semiconductor material, the present inventors have succeeded in providing a method capable of producing hydrogen by light irradiation with high efficiency and a device capable of generating hydrogen by light irradiation with high efficiency.

A first aspect of the present invention provides a semiconductor material including an oxynitride containing at least one element selected from Group 4 elements and Group 5 elements. In the oxynitride, part of at least one selected from oxygen and nitrogen is substituted with carbon. The semiconductor material according to the first aspect has a band gap corresponding to an absorption edge wavelength of 1008 nm or less, and also has a bandgap wavelength longer than those of conventional semiconductor materials. In addition, when the at least one element selected from the Group 4 elements and Group 5 elements, an element to be substituted with carbon, the degree of substitution with carbon, and the like, are appropriately selected, the semiconductor material according to the first aspect can be obtained as a semiconductor material having band edges between which the oxidation-reduction potentials of water lie, being capable of absorbing visible light with a wavelength of 700 nm or more, and further being excellent in stability in water (particularly, neutral or acidic water) during light irradiation. Therefore, hydrogen can be generated more efficiently than ever before by decomposing water by light irradiation of the semiconductor material of the present invention immersed in a solution containing an electrolyte and water.

A second aspect of the present invention provides the semiconductor material as set forth in the first aspect, the semiconductor material having a single-phase structure. The semiconductor material according to the second aspect can exhibit higher charge separation efficiency.

A third aspect of the present invention provides the semiconductor material as set forth in the first or second aspect, the semiconductor material having a monoclinic crystal structure. For example, in the case where Nb is used as the element selected from the Group 4 or Group 5 elements, part of O and/or N of NbON is substituted with C. In this case, it is desirable that the part of O and/or N of NbON be substituted with C, with the crystal structure of NbON maintained. Since the semiconductor material according to the third aspect of the present invention has a monoclinic crystal structure, the crystal structure can be maintained before and after the substitution with C. In addition, the crystallinity is desirably high since it is expected that the closer to a single crystal structure the crystal structure is, the larger the increase in quantum efficiency is. However, also in the case of a homogeneous amorphous structure, high quantum efficiency, although being lower than that in the case of a single crystal structure, can be obtained.

A fourth aspect of the present invention provides the semiconductor material as set forth in any one of the first to third aspects, wherein the at least one element selected from the Group 4 elements and the Group 5 elements is Nb. The semiconductor material according to the fourth aspect makes it possible to absorb visible light having a longer wavelength.

A fifth aspect of the present invention provides the semiconductor material as set forth in any one of the first to fourth aspects, wherein the Group 5 element is in a form having substantially a valence of 5. The semiconductor material according to the fifth aspect can have a more evident band gap.

A sixth aspect of the present invention provides the semiconductor material as set forth in any one of the first to fifth aspects, the semiconductor material having a photocatalytic ability. The semiconductor material according to the sixth aspect makes it possible to provide a photocatalyst capable of effective utilization of sunlight.

A seventh aspect of the present invention provides a method of producing hydrogen, the method comprising the step of immersing the semiconductor material according to the first aspect in a solution containing an electrolyte and water, and then irradiating the semiconductor material with light to decompose the water. With the production method according to the seventh aspect, hydrogen can be generated more efficiently than ever before.

An eighth aspect of the present invention provides an optical hydrogen generating device including a container, an electrode including a photocatalytic material, and a counter electrode. The photocatalytic material includes a semiconductor material according to the first aspect. With the hydrogen generating device according to the eighth aspect, hydrogen can be generated more efficiently than ever before.

Hereinafter, embodiments of the semiconductor material, the method of producing hydrogen, and the hydrogen generating device according to the present invention will be described in more detail.

Efficient water decomposition and hydrogen generation using sunlight requires that, as shown in the band state diagram on the left part of FIG. 1, the material used as a photocatalyst be a semiconductor material capable of absorbing visible light having a relatively long wavelength (semiconductor material having a small band gap), and the semiconductor material have band edges (the level of the top of the valence band and the level of the bottom of the conduction band) between which the hydrogen evolution level and the oxygen evolution level lie. In addition, the semiconductor material is required to remain stable in water under light irradiation.

The valence band of a common oxide is composed of the oxygen p orbitals. Therefore, the valence band is usually located at a deep level (high potential) (the right part of FIG. 1). On the other hand, the valence band of a nitride or oxynitride is composed of the nitrogen p orbitals or hybrids of the oxygen and nitrogen p orbitals. Therefore, the valence band is usually located at a shallow level (low potential) (the center of FIG. 1) compared to the valence band of an oxide.

Thus, as disclosed in Patent Literature 3, the use of an oxynitride makes it possible to obtain a photocatalytic material (semiconductor material) that has a smaller band gap than a material obtained by the use of an oxide. In general, simple nitrides are prone to oxidation. Therefore, there may be a case where a simple nitride is disadvantageously oxidized when left in water under light irradiation for a long period of time. Thus, an oxynitride is more desirable than a simple nitride in view of stability. However, there are known only oxynitride materials that have a band gap larger than the aforementioned desired band gap (corresponding to an absorption edge wavelength of 700 nm). The band gap is at least about 1.91 eV (corresponding to an absorption edge wavelength of 650 nm).

Under these circumstances, the present inventors have found, from results of first-principles calculations, that the valence band composed of the carbon p orbitals is located at a shallow level (low potential) even compared to the valence bands of nitrides and oxynitrides. As a result of a further study, the present inventors have found that a semiconductor material has a valence band composed of the carbon p orbitals and has a smaller band gap than conventional nitrides and oxynitrides when the semiconductor material includes an oxynitride that contains at least one element selected from the Group 4 elements and the Group 5 elements and in which part of at least one selected from oxygen and nitrogen is substituted with carbon. Many of simple carbides of the Group 4 or Group 5 elements have metallic conductivity and do not have a band gap. Therefore, the present invention requires that the semiconductor material include an oxynitride in which part of oxygen and/or nitrogen is substituted with carbon.

Figure 2A:
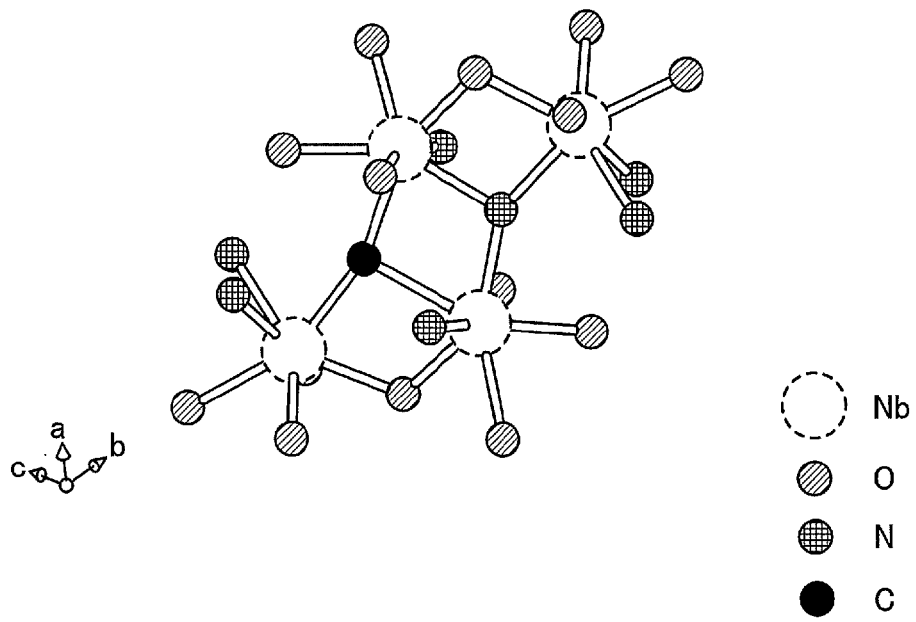
FIG. 2A shows a material in which an oxygen site of NbON is substituted with carbon.
Figure 2B:
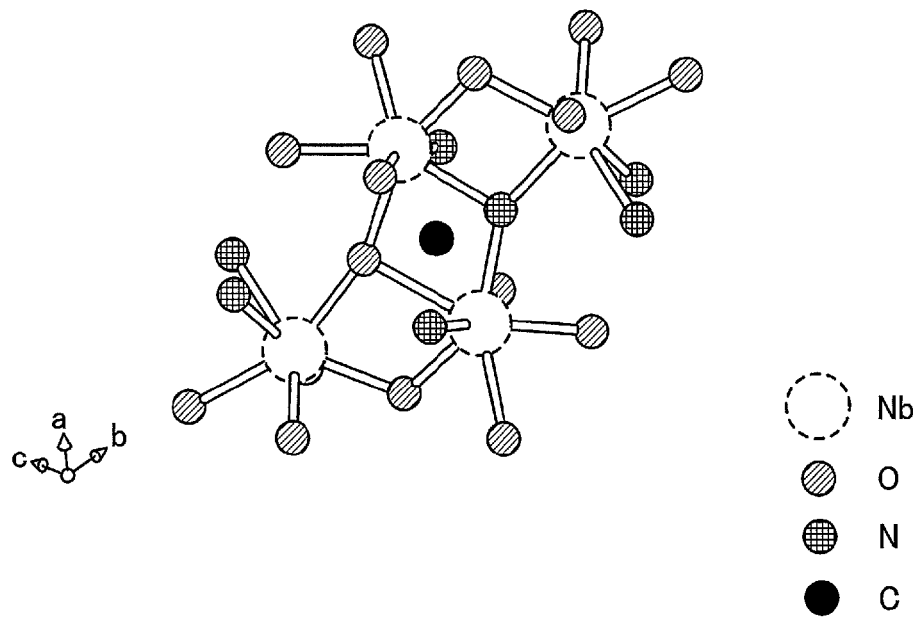
FIG. 2B shows a material in which NbON is doped with carbon.

FIGS. 2A and 2B diagrammatically show the difference between a material in which an oxygen site of monoclinic NbON is substituted with carbon and a material in which NbON is doped with carbon. FIG. 2A shows a form in which an oxygen site of NbON is substituted with carbon. In this form, a carbon atom is present instead of an oxygen atom previously present at the oxygen site. FIG. 2B shows a form in which NbON is doped with carbon. In this form, a portion other than Nb, oxygen, and nitrogen sites is doped with carbon, with the crystal structure of NbON maintained. In the case where carbon is present not in the form of a substituent occupying the position of oxygen and/or nitrogen constituting the oxynitride but simply in the form of a dopant surrounded by the sites of the metal element, oxygen, and nitrogen constituting the oxynitride, the carbon as a dopant causes a defect. The defect acts as a recombination center of an electron and a hole generated by photoexcitation, thus decreasing the quantum efficiency. Therefore, a semiconductor material consisting of an oxynitride doped with carbon is not preferable in the present invention. It is desirable that an oxygen site and/or a nitrogen site of an oxynitride be substituted with carbon.

In the present invention, energy levels are described not as vacuum levels often used in the semiconductor field but as electrochemical energy levels (FIG. 3 and the subsequent figures showing electronic densities of states determined by quantum chemical calculations are represented by a concept based on vacuum levels, but do not necessarily indicate absolute levels).

The semiconductor material of the present embodiment is a semiconductor material including an oxynitride containing at least one element selected from the Group 4 elements and the Group 5 elements. In the oxynitride, part of at least one selected from oxygen and nitrogen is substituted with carbon.

When a semiconductor material is used as a photocatalyst, holes and electrons generated by light irradiation need to be quickly charge-separated. The efficiency of the charge separation influences the quantum efficiency (the number of electrons activated by excitation/the number of incident photons). Therefore, in the case of a hydrogen generating device using a photocatalytic material that is capable of absorbing visible light but is poor in charge separation efficiency, electrons and holes generated by photoexcitation are likely to be recombined, which deteriorates the quantum efficiency and thereby results in a decrease in the hydrogen generation efficiency. Examples of factors that hinder the charge separation include structural defects of the photocatalytic material. Therefore, from the standpoint of charge separation efficiency, it is desired that a single-phase highly-crystalline semiconductor material be used as the photocatalytic material. This is because, in general, the higher the crystallinity of a semiconductor is, the less such defects are. However, in the case where the semiconductor material is a single-phase material, there are not necessarily many defects even when the material is in an amorphous form. In such a case, the material is allowed to be in an amorphous form.

For example, in the case where the semiconductor material is a multiphase mixture (such as the case where the material consists mostly of $Nb_2O_5$ and additionally contains a slight amount of NbCN), when electrons and holes generated by photoexcitation of $Nb_2O_5$ move in the presence of NbCN that does not have the same electron orbital as that of $Nb_2O_5$, the interface between NbCN and $Nb_2O_5$ acts as a recombination center of the electrons and holes, thus decreasing the quantum efficiency. Therefore, in the present invention, the semiconductor material preferably has a single-phase structure when used as a photocatalytic material for the purpose of generating hydrogen by water decomposition. The semiconductor material may contain a small amount of impurities or defects as long as the single-phase structure is maintained. This is because an intrinsic semiconductor free from any impurities is very difficult to produce, and because an intrinsic semiconductor has such a low electron conductivity as to reduce the mobility of electrons generated by photoexcitation, which results in a decrease in the quantum efficiency. Therefore, defects that are so slight as to allow optimal control of the Fermi level are acceptable as long as the single-phase structure is maintained. In addition, a phase of a small amount of impurities (e.g., an oxidized coating or the like) may be contained in the surface of a single-phase bulk. Even in the presence of a surface impurity phase containing a small amount of impurities, the photocatalytic function can be exhibited by quantum effect. The content of the impurities is preferably 1 mol % or less. From the standpoint mentioned above, the crystallinity of the semiconductor material is preferably as high as possible. With respect to defects of the semiconductor, as described above, there is a trade-off relationship between the electron conductivity and the rate of deactivation caused as a result of the defects acting as recombination centers of electrons and holes generated by photoexcitation. Therefore, the amount of defects is preferably 1 mol % or less. Since there is a trade-off relationship between the electron conductivity and the rate of deactivation by recombination with respect to defects, the semiconductor is desirably formed to be thin to the extent that the single-phase structure and high crystallinity are maintained. That is, when the semiconductor is formed as a semiconductor layer, the semiconductor layer desirably has a small thickness. This is because a decrease in the thickness of the semiconductor layer improves the charge separation efficiency. It has been experimentally discovered that the thickness of the semiconductor layer is desirably 500 nm or less in the present invention. However, an excessive decrease in the thickness of the semiconductor layer leads to poor crystallization, and also reduces the amount of light absorbed. Therefore, the thickness of the semiconductor layer is desirably 10 nm or more. That is, the thickness of the semiconductor layer is desirably 10 nm or more and 500 nm or less. Furthermore, it is desirable that the semiconductor layer having a thickness of 10 nm or more and 500 nm or less be designed to have a large surface area. As described above, an increase in the thickness of the semiconductor layer increases the amount of light absorbed but decreases the charge separation efficiency. On the other hand, a decrease in the thickness of the semiconductor layer decreases the amount of light absorbed but improves the charge separation efficiency. There is a trade-off relationship between light absorption and charge separation efficiency with respect to the thickness of the semiconductor layer. Therefore, the semiconductor layer is desirably designed to have a small thickness and a large surface area. This can be achieved by appropriately adjusting the shape of a substrate on which the semiconductor layer is provided. With a large surface area, the semiconductor layer can absorb light having once been transmitted through or scattered at the semiconductor layer during light irradiation.

TaON is known to be a semiconductor having a photocatalytic ability and capable of absorbing light having a wavelength of 500 nm or less. No example of synthesis of a single-phase NbON has been hitherto reported. The present inventors have developed a new synthesis process to synthesize a single-phase NbON, and have found that the single-phase NbON is a semiconductor having a photocatalytic ability and capable of absorbing light having a wavelength of 600 nm or less. In addition, it has been experimentally confirmed that both TaON and NbON are a photocatalytic material capable of water decomposition, and it has also been confirmed that the oxidation-reduction potentials of water lie between the valence band and the conduction band of both TaON and NbON.

The band gaps of materials resulting from substitution of oxygen and/or nitrogen sites of TaON with carbon were calculated by first-principles calculations. FIGS. 3A to 3D show the electronic density of states distribution (Density of State) determined by first-principles calculations for TaON and materials resulting from substitution of oxygen and/or nitrogen sites of TaON with carbon. For example, for the case of TaON, the first-principles calculation was carried out on the assumption that a unit lattice includes four Ta atoms, four oxygen atoms, and four nitrogen atoms, and such unit lattices are arranged continuously to infinity under periodic boundary conditions. Therefore, FIG. 3B shows the electronic density of states distribution of a material obtained by substitution of one oxygen atom with a carbon atom in the unit lattice. That is, FIG. 3B shows the electronic density of states distribution of a material having four Ta atoms, three oxygen atoms, four nitrogen atoms, and one carbon atom in the unit lattice and thus containing 8.3 at % (mol %) of carbon. FIG. 3C shows the electronic density of states distribution of a material obtained by substitution of one nitrogen atom with a carbon atom in the unit lattice. That is, FIG. 3C shows the electronic density of states distribution of a material having four Ta atoms, four oxygen atoms, three nitrogen atoms, and one carbon atom in the unit lattice and thus containing 8.3 at % (mol %) of carbon. FIG. 3D shows the electronic density of states distribution of a material obtained by substitution of one oxygen atom and one nitrogen atom with two carbon atoms in the unit lattice. That is, FIG. 3D shows the electronic density of states distribution of a material having four Ta atoms, three oxygen atoms, three nitrogen atoms, and two carbon atoms in the unit lattice and thus containing 16.7 at % (mol %) of carbon.

Figure 3A:
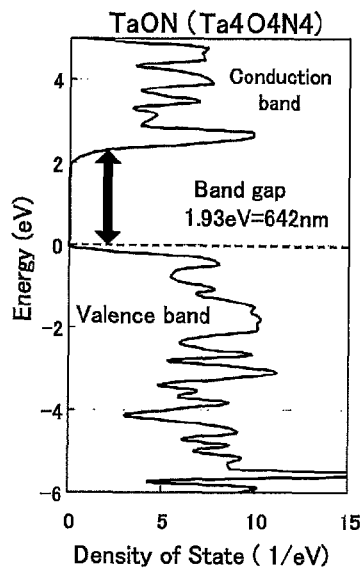
FIGS. 3A to 3D show the electronic density of states of Ta-containing materials determined by first-principles calculations.
Figure 3B:
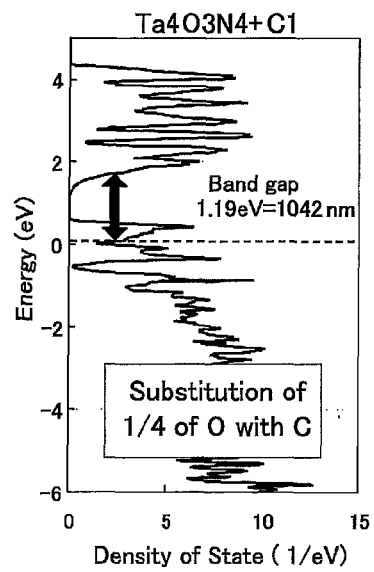
Figure 3C:
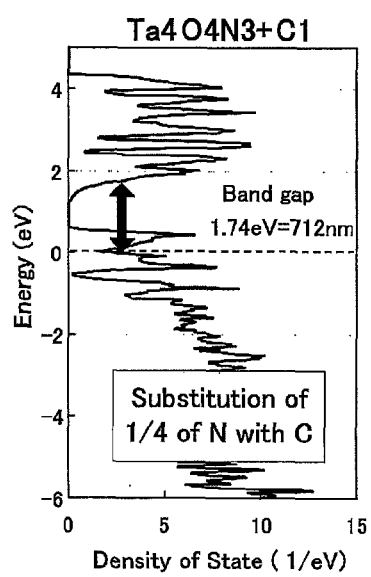
Figure 3D:
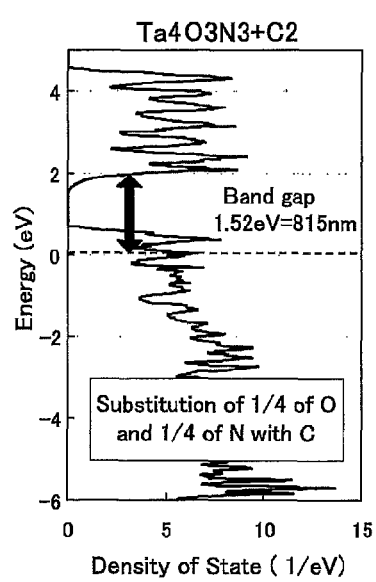

The calculation result obtained by the first-principles calculation for TaON of FIG. 3A was that the band gap was 1.93 eV which corresponds to 642 nm. It is general that band gaps determined as a result of first-principles calculations are smaller than actual band gaps. From the fact that the actually-measured band gap of TaON is 500 nm, it was understood that the band gap calculated by the first-principles calculation is 0.78 times the actually-measured band gap. FIGS. 3A to 3D are the calculation results for the cases of carbon substitution in TaON having the same monoclinic crystal structure. Generally, results of first-principles calculations for the same crystal structure show the same trend. In view of this, the ratio between the calculated value and actual measured value of the band gap of TaON of FIG. 3A was applied to the band gap calculation results of FIGS. 3B to 3D to estimate the band gaps. As a result, it was found that substitution of oxygen sites of TaON with carbon has the greatest effect in reducing the band gap (providing longer-wavelength visible light responsivity).

Similarly, the band gaps of materials resulting from substitution of oxygen and/or nitrogen sites of NbON with carbon were calculated by first-principles calculations. FIGS. 4A to 4D show the electronic density of states distribution (Density of State) determined by first-principles calculations for NbON and materials resulting from substitution of oxygen and/or nitrogen sites of NbON with carbon. For example, for the case of NbON, the first-principles calculation was carried out on the assumption that a unit lattice includes four Nb atoms, four oxygen atoms, and four nitrogen atoms, and such unit lattices are arranged continuously to infinity under periodic boundary conditions. Therefore, FIG. 4B shows the electronic density of states distribution of a material obtained by substitution of one oxygen atom with a carbon atom in the unit lattice. That is, FIG. 4B shows the electronic density of states distribution of a material having four Nb atoms, three oxygen atoms, four nitrogen atoms, and one carbon atom in the unit lattice and thus containing 8.3 at % (mol %) of carbon. FIG. 4C shows the electronic density of states distribution of a material obtained by substitution of one nitrogen atom with a carbon atom in the unit lattice. That is, FIG. 4C shows the electronic density of states distribution of a material having four Nb atoms, four oxygen atoms, three nitrogen atoms, and one carbon atom in the unit lattice and thus containing 8.3 at % (mol %) of carbon. FIG. 4D shows the electronic density of states distribution of a material obtained by substitution of one oxygen atom and one nitrogen atom with two carbon atoms in the unit lattice. That is, FIG. 4D shows the electronic density of states distribution of a material having four Nb atoms, three oxygen atoms, three nitrogen atoms, and two carbon atoms in the unit lattice and thus containing 16.7 at % (mol %) of carbon.

Figure 4A:
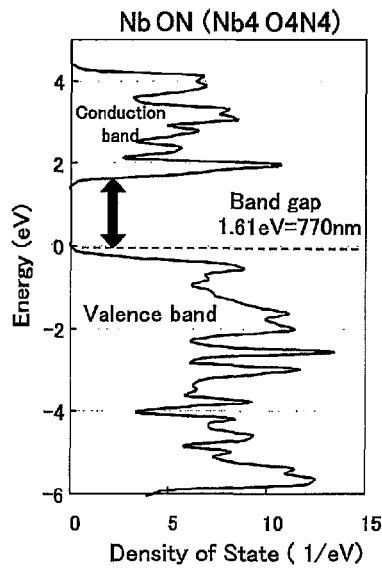
FIGS. 4A to 4D show the electronic density of states of Nb-containing materials determined by first-principles calculations.
Figure 4B:
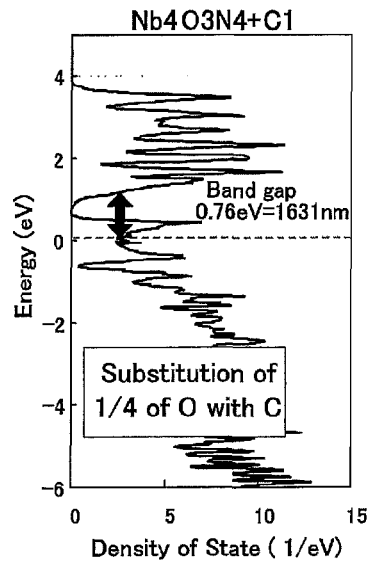
Figure 4C:
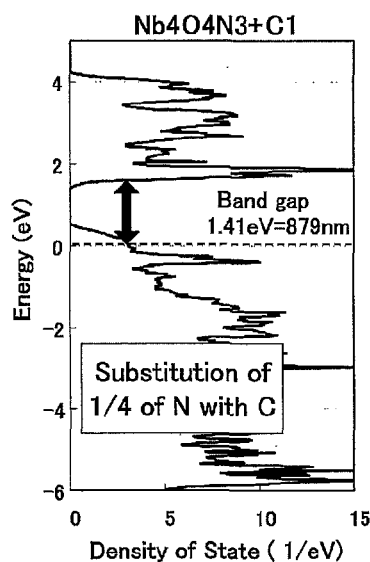
Figure 4D:
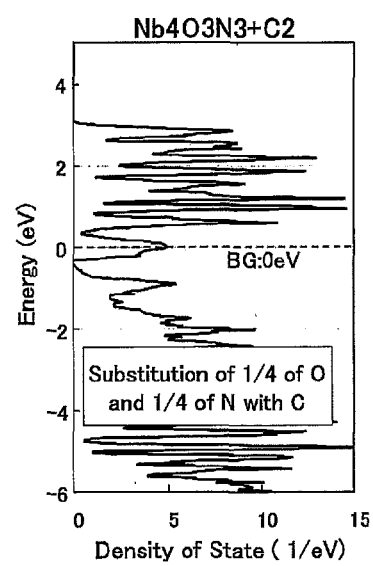

The calculation result obtained by the first-principles calculation for NbON of FIG. 4A was that the band gap was 1.61 eV which corresponds to 770 nm. It is general that band gaps determined as a result of first-principles calculations are smaller than actual band gaps. From the fact that the actually-measured band gap of NbON is 600 nm, it was understood that the band gap calculated by the first-principles calculation is 0.78 times the actually-measured band gap as in the case of TaON materials. FIGS. 4A to 4D are the calculation results for the cases of carbon substitution in NbON having the same monoclinic crystal structure. Generally, results of first-principles calculations for the same crystal structure show the same trend. In view of this, the ratio between the calculated value and actual measured value of the band gap of NbON of FIG. 4A was applied to the band gap calculation results of FIGS. 4B to 4D to estimate the band gaps. As a result, it was found that substitution of oxygen sites of NbON with carbon has the greatest effect in reducing the band gap (providing longer-wavelength visible light responsivity). Furthermore, it was found that, in the case of FIG. 4D, the material is converted into a conductive material due to excessive reduction in the band gap. The Fermi level (0 eV) is present below the top of the valence band levels, which is for both TaON and NbON. Such a state indicates that a level empty of electrons is present among the valence band levels. Such an electronic state is not preferable because a photoexcited electron is likely to transit down to the empty electronic level in the valence band, which increases the probability of recombination of the excited electron and a hole.

In view of the above, the band gaps of materials resulting from substitution of oxygen sites of NbON with varying amounts of carbon were calculated by first-principles calculations. FIGS. 5A to 5F show the electronic density of states distribution (Density of State) determined by first-principles calculations for NbON and materials resulting from substitution of oxygen sites of NbON with carbon. For the cases of FIGS. 4A to 4D, the calculations were performed by assuming a unit lattice including four Nb atoms. For the cases of FIGS. 5A to 5F, however, the calculations were made by assuming a unit lattice including eight or more Nb atoms, in order to vary the amount of substitutional carbon. The calculations were carried out on the assumption that such unit lattices are arranged continuously to infinity under periodic boundary conditions. Therefore, FIG. 5B shows the electronic density of states distribution of a material obtained by substitution of one oxygen atom with a carbon atom in a unit lattice including eight Nb atoms. That is, the material of FIG. 5B has eight Nb atoms, seven oxygen atoms, eight nitrogen atoms, and one carbon atom in the unit lattice, and thus contains 4.2 at % (mol %) of carbon. FIG. 5C shows the electronic density of states distribution of a material obtained by substitution of three oxygen atoms with three carbon atoms in a unit lattice including sixteen Nb atoms. That is, FIG. 5C shows the electronic density of states distribution of a material having sixteen Nb atoms, thirteen oxygen atoms, sixteen nitrogen atoms, and three carbon atoms in the unit lattice and thus containing 6.3 at % (mol %) of carbon. For reference, FIG. 5D shows the electronic density of states distribution of the same material as shown in FIG. 4B, that is, a material obtained by substitution of one oxygen atom with a carbon atom in a unit lattice including four Nb atoms. That is, FIG. 5D shows the electronic density of states distribution of a material having four Nb atoms, three oxygen atoms, four nitrogen atoms, and one carbon atom in the unit lattice and thus containing 8.3 at % (mol %) of carbon. FIG. 5E shows the electronic density of states distribution of a material obtained by substitution of one oxygen atom with one carbon atom in a unit lattice including thirty-two Nb atoms. That is, FIG. 5E shows the electronic density of states distribution of a material having thirty-two Nb atoms, thirty-one oxygen atoms, thirty-two nitrogen atoms, and one carbon atom in the unit lattice and thus containing 1.0 at % (mol %) of carbon. FIG. 5F shows the electronic density of states distribution of a material obtained by substitution of one oxygen atom with one carbon atom in a unit lattice including sixteen Nb atoms.

That is, FIG. 5F shows the electronic density of states distribution of a material having sixteen Nb atoms, fifteen oxygen atoms, sixteen nitrogen atoms, and one carbon atom in the unit lattice and thus containing 2.1 at % (mol %) of carbon.

Figure 5A:
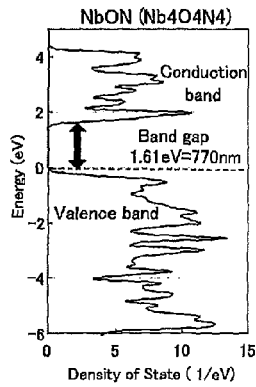
FIGS. 5A to 5F show the electronic density of states of Nb-containing materials determined by first-principles calculations.
Figure 5B:
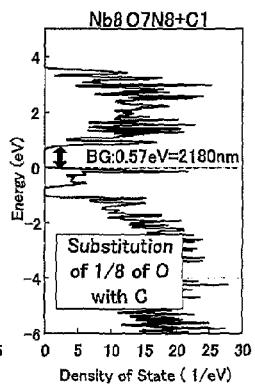
Figure 5C:
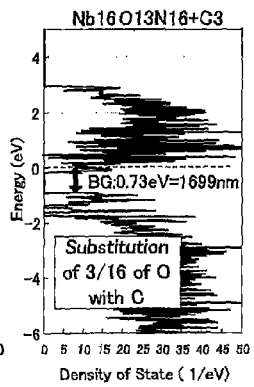
Figure 5D:
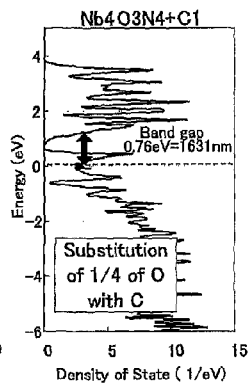
Figure 5E:
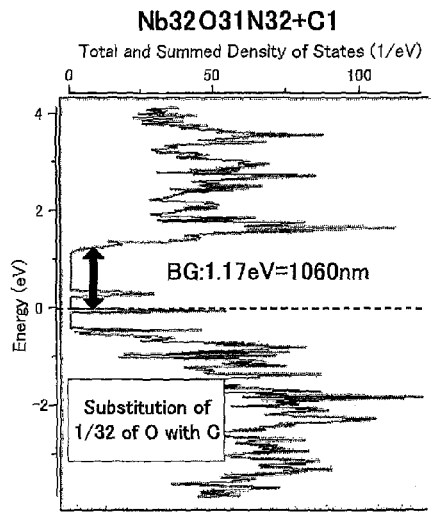
Figure 5F:
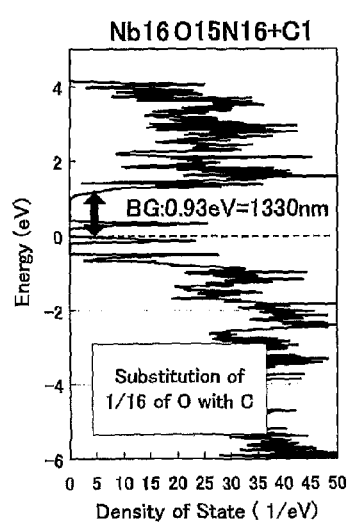

The calculation result obtained by the first-principles calculation for NbON of FIG. 5A was that the band gap was 1.61 eV which corresponds to 770 nm. It is general that band gaps determined as a result of first-principles calculations are smaller than actual band gaps. From the fact that the actually-measured band gap of NbON is 600 nm, it was understood that the band gap calculated by the first-principles calculation is 0.78 times the actually-measured band gap as in the case of FIG. 4A. FIGS. 5A to 5F represent calculations for the cases of carbon substitution in NbON having the same monoclinic crystal structure, and results of first-principles calculations for the same crystal structure generally show the same trend. In view of this, the ratio between the calculated value and actual measured value of the band gap of NbON of FIG. 5A was applied to the band gap calculation results of FIGS. 5B to 5F to estimate the band gaps. As a result, the following facts were revealed. For the case where 8.3 at % (mol %) of carbon is contained (FIG. 5D), although a band gap-like valley is observed in the electronic density of states, the Fermi level is present in the valence band and below the first peak from the top of the valence band, and therefore, the material has an extremely small band gap or is close to a conductive material. For the case where 6.3 at % (mol %) of carbon is contained (FIG. 5C), the material is obviously a conductive material since the Fermi level (0 eV) is present among the conduction band levels. However, for the case where the carbon content is 4.2 at % (mol %) or less (FIGS. 5B, 5E, and 5F), it was found that the Fermi level (0 eV) is present at the top of the valence band. That is, it was found that, in the case of substitution of carbon for oxygen sites of NbON, a longer-wavelength visible light-responsive material can be obtained in a preferred electronic state by adjusting the carbon content to 4.2 at % (mol %) or less.

It is general that band gaps determined by quantum chemical calculations are smaller than actual band gaps. However, quantum chemical calculations allow accurate determination of the trend of the electronic density of states distribution. That is, an accurate calculation can be made, for example, for determination as to whether a material has a band gap characteristic of a semiconductor and whether the material is a conductive material.

Next, the band gaps of materials resulting from substitution of nitrogen sites of NbON with varying amounts of carbon were calculated by first-principles calculations. FIGS. 6A to 6F show the electronic density of states distribution (Density of State) determined by first-principles calculations for NbON and materials resulting from substitution of nitrogen sites of NbON with carbon. For the cases of FIGS. 4A to 4D, the calculations were performed by assuming a unit lattice including four Nb atoms. For the cases of FIGS. 6A to 6F, however, the calculations were made by assuming a unit lattice including eight or more Nb atoms, in order to vary the amount of substitutional carbon. The calculations were carried out on the assumption that such unit lattices are arranged continuously to infinity under periodic boundary conditions. Therefore, FIG. 6B shows the electronic density of states distribution of a material obtained by substitution of one nitrogen atom with a carbon atom in a unit lattice including eight Nb atoms. That is, FIG. 6B shows the electronic density of states distribution of a material having eight Nb atoms, eight oxygen atoms, seven nitrogen atoms, and one carbon atom in the unit lattice and thus containing 4.2 at % (mol %) of carbon. FIG. 6C shows the electronic density of states distribution of a material obtained by substitution of three nitrogen atoms with three carbon atoms in a unit lattice including sixteen Nb atoms. That is, the electronic density of states distribution of a material having sixteen Nb atoms, sixteen oxygen atoms, thirteen nitrogen atoms, and three carbon atoms in the unit lattice and thus containing 6.3 at % (mol %) of carbon is shown. For reference, FIG. 6D shows the electronic density of states distribution of the same material as shown in FIG. 4C, that is, a material obtained by substitution of one nitrogen atom with a carbon atom in a unit lattice including four Nb atoms. That is, FIG. 6D shows the electronic density of states distribution of a material having four Nb atoms, four oxygen atoms, three nitrogen atoms, and one carbon atom in the unit lattice and thus containing 8.3 at % (mol %) of carbon. FIG. 6E shows the electronic density of states distribution of a material obtained by substitution of one nitrogen atom with one carbon atom in a unit lattice including thirty-two Nb atoms. That is, FIG. 6E shows the electronic density of states distribution of a material having thirty-two Nb atoms, thirty-two oxygen atoms, thirty-one nitrogen atoms, and one carbon atom in the unit lattice and thus containing 1.0 at % (mol %) of carbon. FIG. 6F shows the electronic density of states distribution of a material obtained by substitution of one nitrogen atom with one carbon atom in a unit lattice including sixteen Nb atoms. That is, FIG. 6F shows the electronic density of states distribution of a material having sixteen Nb atoms, sixteen oxygen atoms, fifteen nitrogen atoms, and one carbon atom in the unit lattice and thus containing 2.1 at % (mol %) of carbon.

Figure 6A:
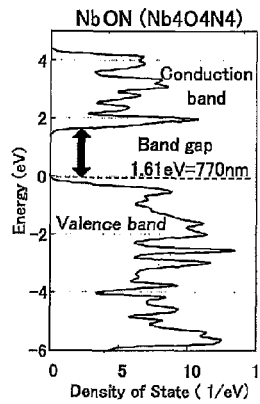
FIGS. 6A to 6F shows the electronic density of states of Nb-containing materials determined by first-principles calculations.
Figure 6B:
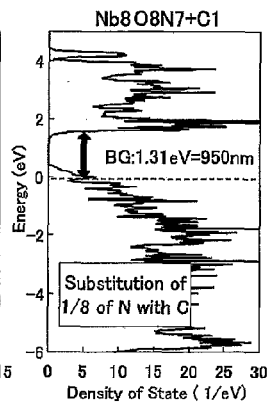
Figure 6C:
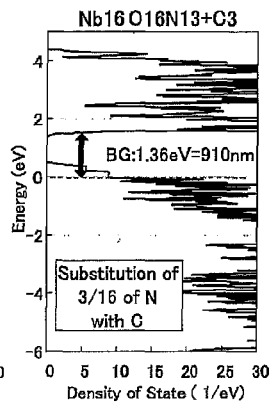
Figure 6D:
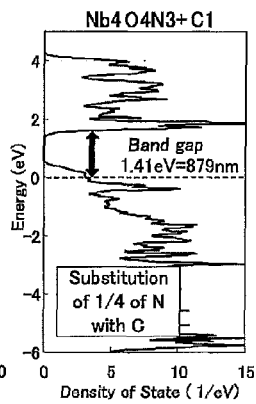
Figure 6E:
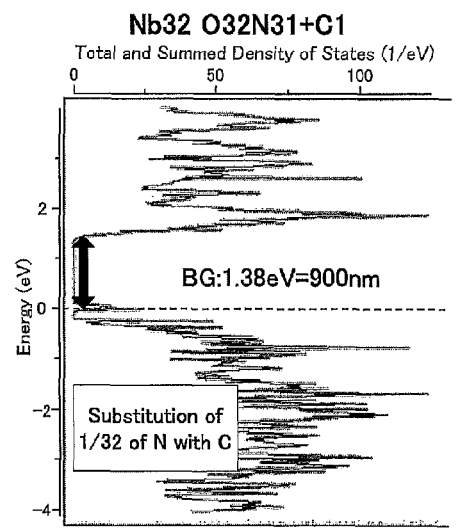
Figure 6F:
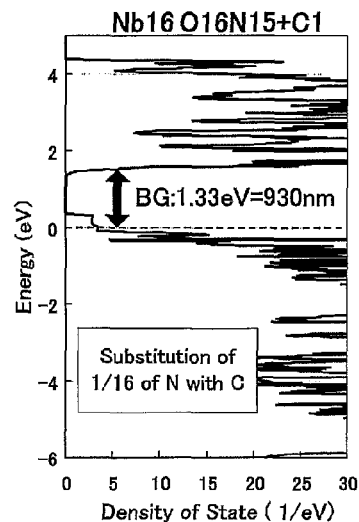

The calculation result obtained by the first-principles calculation for NbON of FIG. 6A was that the band gap was 1.61 eV which corresponds to 770 nm. It is general that band gaps determined as a result of first-principles calculations are smaller than actual band gaps. From the fact that the actually-measured band gap of NbON is 600 nm, it was understood that the band gap calculated by the first-principles calculation is 0.78 times the actually-measured band gap as in the case of FIG. 4A. FIGS. 6A to 6F represent calculations for the cases of carbon substitution in NbON having the same monoclinic crystal structure, and results of first-principles calculations for the same crystal structure generally show the same trend. In view of this, the ratio between the calculated value and actual measured value of the band gap of NbON of FIG. 6A was applied to the band gap calculation results of FIGS. 6B to 6F to estimate the band gaps. As a result, it was found that, in any case where nitrogen of NbON is substituted with carbon, the effect of providing longer-wavelength visible light responsivity (increasing the bandgap wavelength) is obtained but the Fermi level (0 eV) is present below the top of the valence band levels. This state indicates that a level empty of electrons is present among the valence band levels. Although the material is a semiconductor, such an electronic state is not preferable because a photoexcited electron is likely to transit down to the empty electronic level in the valence band, which increases the probability of recombination of the excited electron and a hole. Thus, it was found that an increase in the bandgap wavelength of the semiconductor material is achieved in any case where oxygen and/or nitrogen sites of NbON are substituted with carbon, and that when the semiconductor material is used as a photocatalytic material, the material is more preferably one resulting from substitution of oxygen sites with carbon.

Next, the band gaps of materials resulting from substitution of both oxygen sites and nitrogen sites of NbON with varying amounts of carbon were calculated by first-principles calculations. FIGS. 7A to 7F show the electronic density of states distribution (Density of State) determined by first-principles calculations for NbON and materials resulting from substitution of oxygen and nitrogen sites of NbON with carbon. For the cases of FIGS. 4A to 4D, the calculations were performed by assuming a unit lattice including four Nb atoms. For the cases of FIGS. 7A to 7F, however, the calculations were made by assuming a unit lattice including eight or more Nb atoms, in order to vary the amount of substitutional carbon. The calculations were carried out on the assumption that such unit lattices are arranged continuously to infinity under periodic boundary conditions. Therefore, FIG. 7B shows the electronic density of states distribution of a material obtained by substitution of one oxygen atom and one nitrogen atom with two carbon atoms in a unit lattice including sixteen Nb atoms. That is, FIG. 7B shows the electronic density of states distribution of a material having sixteen Nb atoms, fifteen oxygen atoms, fifteen nitrogen atoms, and two carbon atoms in the unit lattice and thus containing 4.2 at % (mol %) of carbon. FIG. 7C shows the electronic density of states distribution of a material obtained by substitution of one oxygen site and one nitrogen site with two carbon atoms in a unit lattice including eight Nb atoms. That is, FIG. 7C shows the electronic density of states distribution of a material having eight Nb atoms, seven oxygen atoms, seven nitrogen atoms, and two carbon atoms in the unit lattice and thus containing 8.3 at % (mol %) of carbon. For reference, FIG. 7D shows the electronic density of states distribution of the same material as shown in FIG. 3D, that is, a material obtained by substitution of one oxygen site and one nitrogen site with two carbon atoms in a unit lattice including four Nb atoms. That is, FIG. 7D shows the electronic density of states distribution of a material having four Nb atoms, three oxygen atoms, three nitrogen atoms, and two carbon atoms in the unit lattice and thus containing 16.7 at % (mol %) of carbon. FIG. 7E shows the electronic density of states distribution of a material obtained by substitution of one oxygen site and two nitrogen sites with three carbon atoms in a unit lattice including sixteen Nb atoms. That is, FIG. 7E shows the electronic density of states distribution of a material having sixteen Nb atoms, fifteen oxygen atoms, fourteen nitrogen atoms, and three carbon atoms in the unit lattice and thus containing 6.3 at % (mol %) of carbon. FIG. 7F shows the electronic density of states distribution of a material obtained by substitution of two oxygen sites and one nitrogen site with three carbon atoms in a unit lattice including sixteen Nb atoms. That is, FIG. 7F shows the electronic density of states distribution of a material having sixteen Nb atoms, fourteen oxygen atoms, fifteen nitrogen atoms, and three carbon atoms in the unit lattice and thus containing 6.3 at % (mol %) of carbon.

Figure 7A:
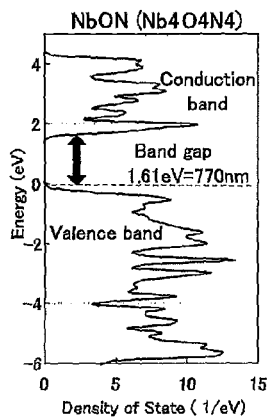
FIGS. 7A to 7F show the electronic density of states of Nb-containing materials determined by first-principles calculations.
Figure 7B:
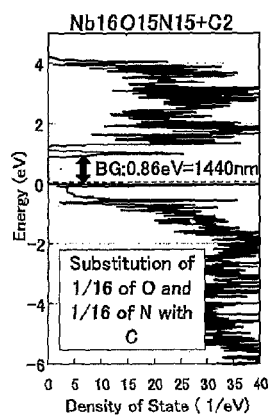
Figure 7C:
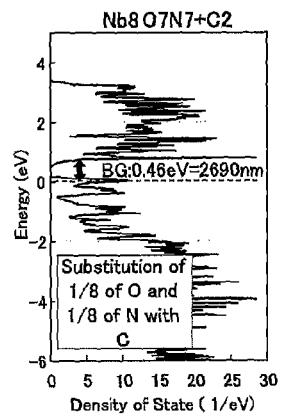
Figure 7D:
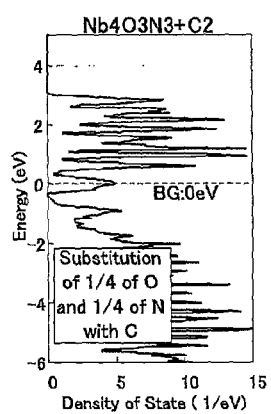
Figure 7E:
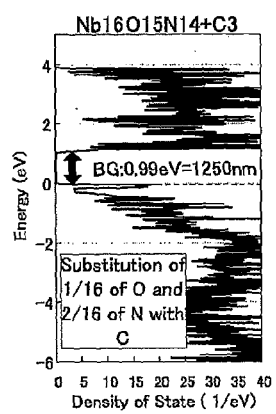
Figure 7F:
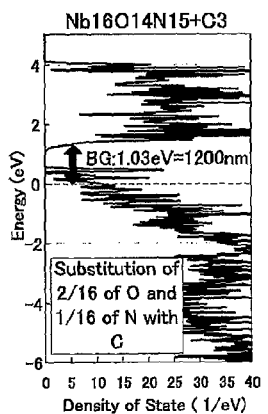

The calculation result obtained by the first-principles calculation for NbON of FIG. 7A was that the band gap was 1.61 eV which corresponds to 770 nm. It is general that band gaps determined as a result of first-principles calculations are smaller than actual band gaps. From the fact that the actually-measured band gap of NbON is 600 nm, it was understood that the band gap calculated by the first-principles calculation is 0.78 times the actually-measured band gap as in the case of FIG. 4A. FIGS. 7A to 7F represent calculations for the cases of carbon substitution in NbON having the same monoclinic crystal structure, and results of first-principles calculations for the same crystal structure generally show the same trend. In view of this, the ratio between the calculated value and actual measured value of the band gap of NbON of FIG. 7A was applied to the band gap calculation results of FIGS. 7B to 7F to estimate the band gaps. From the results, it is understood that the material is obviously a conductive material in the case where 16.7 at % (mol %) of carbon is contained (FIG. 7D). It was also found that the Fermi level (0 eV) is present at the top of the valence band in the case where 8.3 at % (mol %) of carbon is contained (FIG. 7C). That is, it was found that, in the case of substitution of carbon for oxygen and nitrogen sites of NbON, a longer-wavelength visible light-responsive material can be obtained in a preferred electronic state by adjusting the carbon content to 8.3 at % (mol %) or less. In addition, it was found that a longer-wavelength visible light-responsive material can be obtained in a preferred electronic state also in the case where the ratio between oxygen and nitrogen substituted with carbon is not 1:1 (FIG. 7E). However, the material of FIG. 7F, although being a semiconductor, is not preferable because a state empty of electrons is created in the valence band.

It is general that band gaps determined by quantum chemical calculations are smaller than actual band gaps. However, quantum chemical calculations allow accurate determination of the trend of the electronic density of states distribution. That is, an accurate calculation can be made, for example, for determination as to whether a material has a band gap characteristic of a semiconductor and whether the material is a conductive material.

Considering all the matters discussed above, it can be determined which of substitution of oxygen sites with carbon and substitution of nitrogen sites with carbon is more advantageous. That is, either substitution of oxygen sites with carbon or substitution of nitrogen sites with carbon has the effect of providing longer-wavelength visible light responsivity, and random substitution of both oxygen sites and nitrogen sites with carbon also has the effect of providing longer-wavelength visible light responsivity. However, it was found that preferential substitution of oxygen sites with carbon produces a greater effect of providing longer-wavelength visible light responsivity with a smaller amount of substitutional carbon. Also, it was found that the material is converted into a conductive material having no semiconductor properties when the substitutional carbon amount is too large. Furthermore, it was found that the larger the substitutional carbon amount is, the smaller the band gap is, as long as the substitutional carbon amount is within a predetermined range. In addition, it was found that, in the case of substitution of oxygen sites with carbon, the effect of providing longer-wavelength visible light responsivity is markedly exhibited when the proportion of substitutional carbon is 4.2 at % or less. It was also found that, in the case of substitution of nitrogen sites with carbon or random substitution of oxygen sites and nitrogen sites with carbon, the effect of providing longer-wavelength visible light responsivity is exhibited when the proportion of substitutional carbon is 8.3 at % or less.

Since the conduction band is composed of the outermost d orbitals of the metal element Ta or Nb which are empty of electrons, the levels of the d orbitals of Ta or Nb are not changed even when oxygen and/or nitrogen sites are substituted with carbon. Therefore, it was found that the band gap-reducing effect provided by substitution of oxygen and/or nitrogen sites with carbon is an effect obtained as a result of the valence band levels being displaced. That is, it was found that control of the amount of carbon substituting for oxygen and nitrogen allows control of the magnitude of the band gap and at the same time allows control of the valence band levels. If the semiconductor material is used as a photocatalyst for water decomposition by photocatalyst light irradiation, the oxygen evolution overpotential in the water decomposition can be freely set by controlling the amount of carbon substituting for oxygen and nitrogen sites since the semiconductor material is a n-type semiconductor. Generally, in water decomposition reaction, the oxygen evolution overpotential is larger than the hydrogen evolution overpotential. Therefore, it was found that the capability of controlling the oxygen evolution overpotential is effective in device design.

As described above, the semiconductor material of the present embodiment is capable of absorbing visible light, and has band edges between which the oxidation-reduction potentials of water lie. Furthermore, the semiconductor material of the present embodiment is excellent in stability in water during light irradiation. Therefore, when the semiconductor material of the present embodiment is immersed in water containing an electrolyte and is irradiated with sunlight to decompose the water, hydrogen can be generated more efficiently than ever before.

According to the present embodiment, it is also possible to implement a hydrogen production method including the step of irradiating the semiconductor material of the present embodiment immersed in a solution containing an electrolyte and water with light so as to decompose the water.

The production method of the present embodiment can be carried out similarly to commonly-known methods (see Patent Literature 1 and 2, for example) by replacing a commonly-known photocatalytic material with the above-described photocatalytic material. Specific examples include a method using the below-described optical hydrogen generating device of the present embodiment.

With the production method of the present embodiment, hydrogen can be generated with high efficiency.

The optical hydrogen generating device of the present embodiment includes a container, an electrode containing a photocatalytic material, and a counter electrode. The photocatalytic material includes the above-described semiconductor material of the present embodiment. Examples of the configuration of the hydrogen generating device of the present embodiment are shown in FIG. 15 and FIG. 16.

When the semiconductor material in the form of a bulk or powder is irradiated with light in water, even if the water is decomposed to generate hydrogen and oxygen, most of the hydrogen and oxygen generated are almost instantly recombined into water. Therefore, it is preferable that hydrogen and oxygen be generated separately from each other. Thus, it is preferable that the photocatalytic material be formed into an electrode, a separate counter electrode electrically connected to the electrode be provided, and a chamber for hydrogen generation and a chamber for oxygen generation be separated. In some cases, a configuration may be employed in which hydrogen is generated from one surface of a single electrode and oxygen is generated from the opposite surface of the single electrode.

Figure 15:
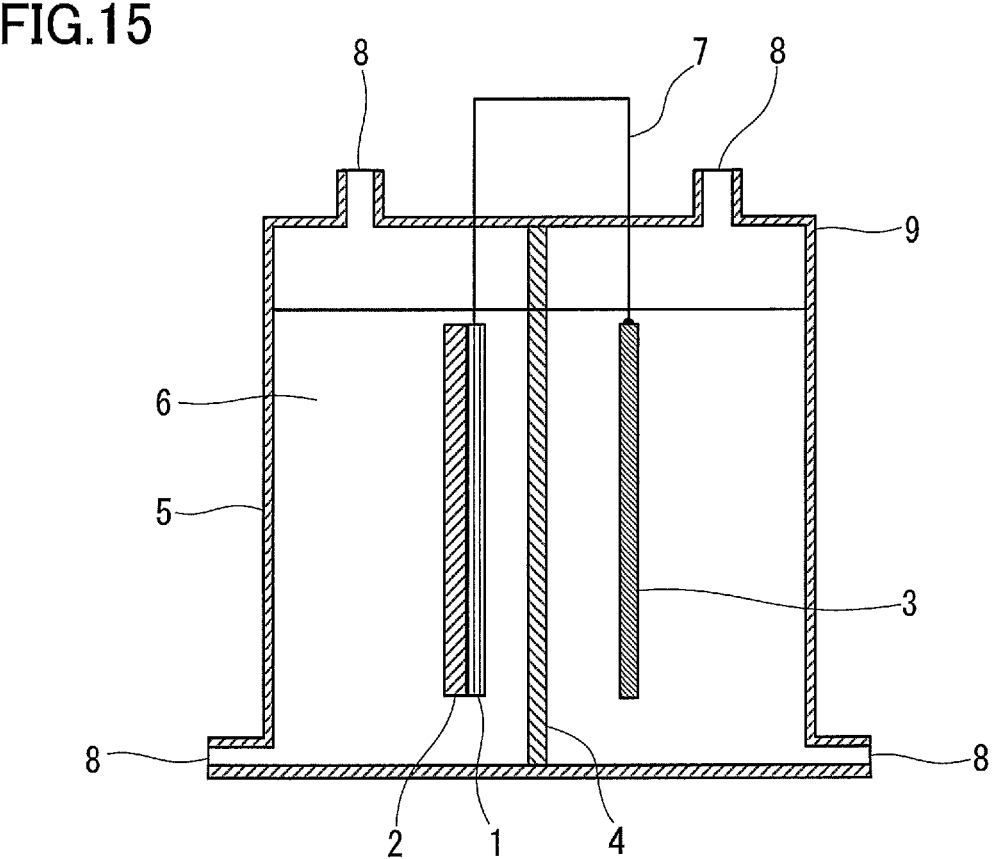
FIG. 15 is a schematic cross-sectional view showing an example of an optical hydrogen generating device of an embodiment of the present invention.
Figure 16:
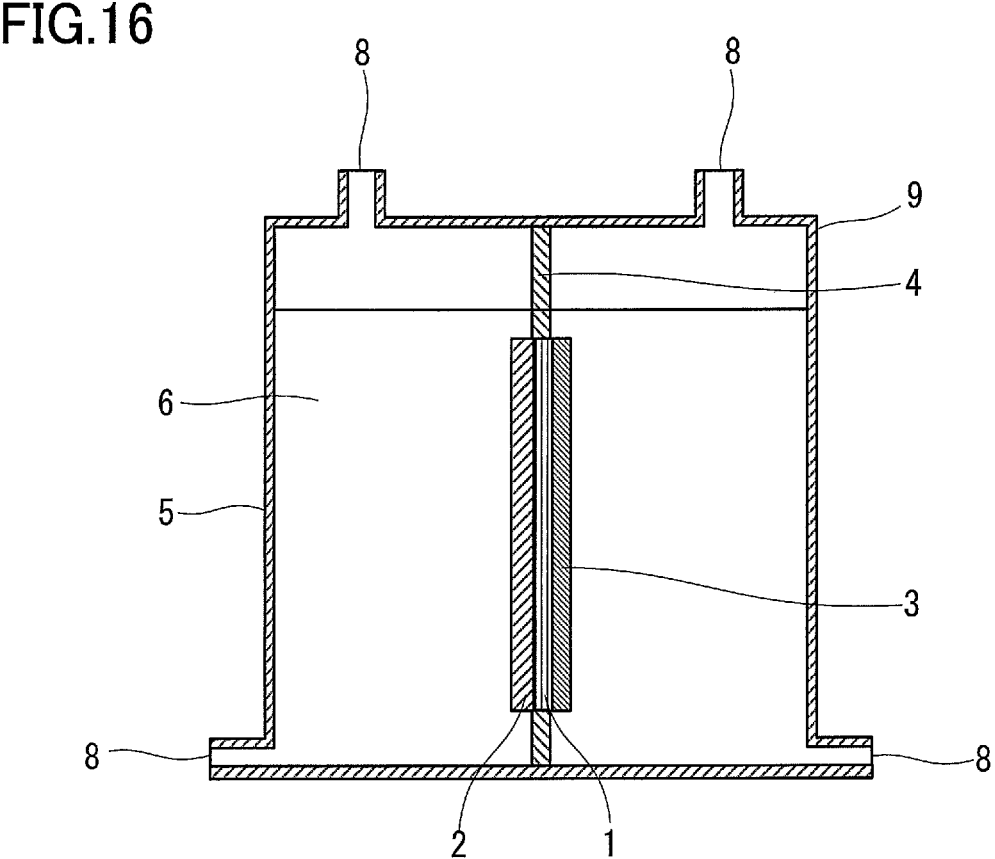
FIG. 16 is a schematic cross-sectional view showing another example of an optical hydrogen generating device of an embodiment of the present invention.

An optical hydrogen generating device of FIG. 15 includes a container 9, a photocatalytic electrode 2, a conductive substrate 1, and a counter electrode 3. The container 9 has, in its upper part, two openings 8 for respectively collecting hydrogen and oxygen. Also, the container 9 has, in its lower part, two openings 8 serving as feed water inlets. A solution 6 containing an electrolyte and water is held in the container 9. In order to separate a chamber for hydrogen generation and a chamber for oxygen generation from each other, the container 9 has a separator 4 between the photocatalytic electrode 2 and the counter electrode 3. The separator 4 has a function of allowing ion permeation and separating a gas generated on the photocatalytic electrode 2 side from a gas generated on the counter electrode 3 side. The portion (light incident portion 5) of the container 9 that faces the surface of the photocatalytic electrode 2 disposed in the container 9 is made of a material that allows transmission of light such as sunlight. The photocatalytic electrode 2 and the counter electrode 3 are electrically connected by a conducting wire 7.

The photocatalytic electrode 2 is a semiconductor having a band gap, and thus generally has a lower conductivity than metals etc. In addition, recombination of electrons and holes needs to be prevented as much as possible. Therefore, the photocatalytic electrode 2 preferably has a small thickness. Thus, in this embodiment, the photocatalytic electrode 2 is formed as a thin film (with a thickness of about 50 to 500 nm) on the conductive substrate 1. Also, in order to increase the light absorption efficiency, the photocatalytic electrode 2 preferably has a large surface area.

The photocatalytic electrode 2 preferably has high crystallinity. When the electrode is flat and smooth, its crystal orientation is preferably in the thickness direction of the electrode. When the electrode is not flat or smooth, its crystal orientation is preferably in a direction parallel to the movement direction of electrons or holes generated by photoexcitation.

Another optical hydrogen generating device shown in FIG. 16 also includes the container 9, the photocatalytic electrode 2, the conductive substrate 1, and the counter electrode 3 (the same members as those of FIG. 15 are denoted by the same reference numerals in FIG. 16). The container 9 has the four openings 8, and the solution 6 containing an electrolyte and water is held in the container 9. The photocatalytic electrode 2 is provided on one surface of the conductive substrate 1, and the counter electrode 3 is provided on the other surface. The photocatalytic electrode 2 is formed as a thin film (with a thickness of about 50 to 500 nm). The photocatalytic electrode 2 and the counter electrode 3 are electrically connected by the conductive substrate 1. In order to separate a chamber for hydrogen generation and a chamber for oxygen generation from each other, the inside of the container 9 is divided into a photocatalytic electrode 2-side section and a counter electrode 3-side section by the separator 4 and the conductive substrate 1. The portion (light incident portion 5) of the container 9 that faces the surface of the photocatalytic electrode 2 disposed in the container 9 is made of a material that allows transmission of light such as sunlight.

Hydrogen and oxygen can be generated by irradiating the optical hydrogen generating device shown in FIG. 15 or FIG. 16 with light (e.g., sunlight) through the light incident portion 5. In particular, the optical hydrogen generating device is capable of absorbing light in a wide wavelength region, and thus can generate hydrogen with high efficiency.

EXAMPLES

Hereinafter, the present invention will be described in detail with reference to examples and comparative examples. However, the present invention is not limited to these examples.

Example 1

A thin film of TaCNO (a semiconductor in which oxygen or nitrogen sites of TaON are substituted with carbon) and a semiconductor thin film of TaON for comparison were formed on quartz substrates by reactive sputtering. The sputter deposition conditions are shown in Table 1.

TABLE 1

| Type of Film | Substrate | Target | Sputtering output (W) | Flow rate of Ar (Pa·m³/s) | Flow rate of O₂ (Pa·m³/s) | Flow rate of N₂ (Pa·m³/s) | Total pressure (Pa) | Substrate temperature (°C.) | Deposition time (hr) | Film thickness (nm) |
|---|---|---|---|---|---|---|---|---|---|---|
| TaON | Quartz | TaN | 30 | 6.1 × 10⁻⁴ (3.6 sccm) | 8.5 × 10⁻⁵ (0.5 sccm) | 2.4 × 10⁻³ (14.3 sccm) | 0.5 | 800 | 8 | 250 |
| TaCNO | Quartz | TaC | 30 | 6.1 × 10⁻⁴ (3.6 sccm) | 5.9 × 10⁻⁵ (0.35 sccm) | 2.4 × 10⁻³ (14.3 sccm) | 0.5 | 800 | 8 | 150 |

Figure 8:
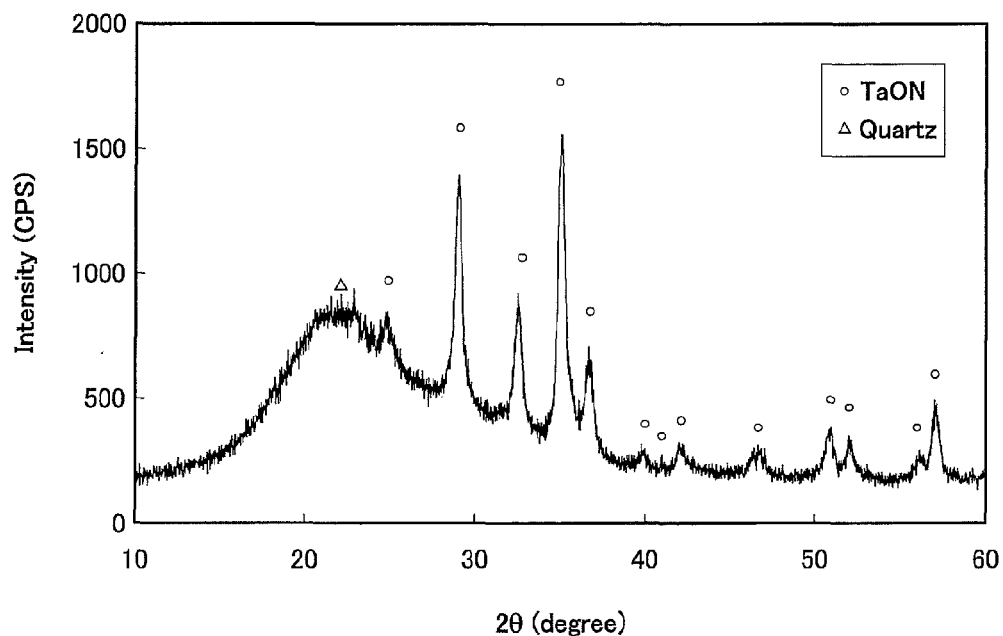
FIG. 8 shows a result of thin film X-ray diffraction measurement on a Ta-containing material.
Figure 9:
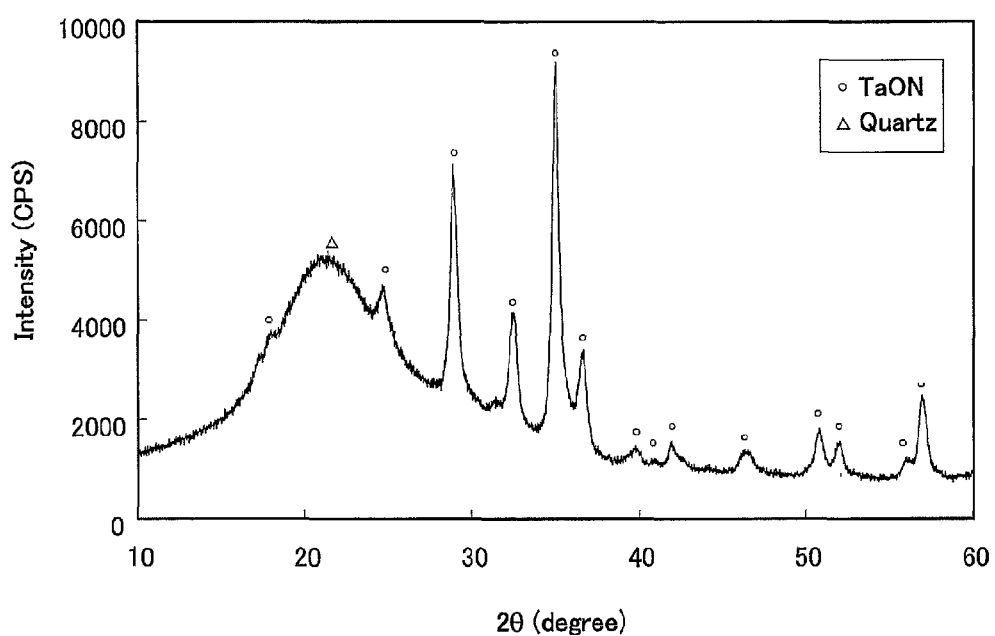
FIG. 9 shows a result of thin film X-ray diffraction measurement on a Ta-containing material.

FIG. 8 shows a thin film X-ray diffraction pattern of the TaON thin film fabricated by reactive sputtering using oxygen and nitrogen gases and using TaN as a sputtering target (starting material). It was confirmed that an almost single-phase TaON thin film was obtained, except for a halo peak of quartz of the substrate. FIG. 9 is a thin film X-ray diffraction pattern of the TaCNO thin film (a thin film made of a material in which oxygen or nitrogen sites of TaON are substituted with carbon) fabricated by reactive sputtering using oxygen and nitrogen gases and using TaC as a sputtering target. Similarly to the above, it was confirmed that an almost single-phase TaON thin film was obtained, except for a halo peak of quartz of the substrate. TaC was used as a target for the TaCNO. Therefore, although the obtained thin film had a crystal system of a monoclinic single-phase TaON, it is expected that a slight amount of carbon remained and substituted for oxygen or nitrogen sites. In addition, since the sputtering was performed at a high temperature of 800° C., it is generally thought that carbon diffused quickly, and substituted for oxygen or nitrogen sites without being present as a defect-causing dopant.

Figure 10:
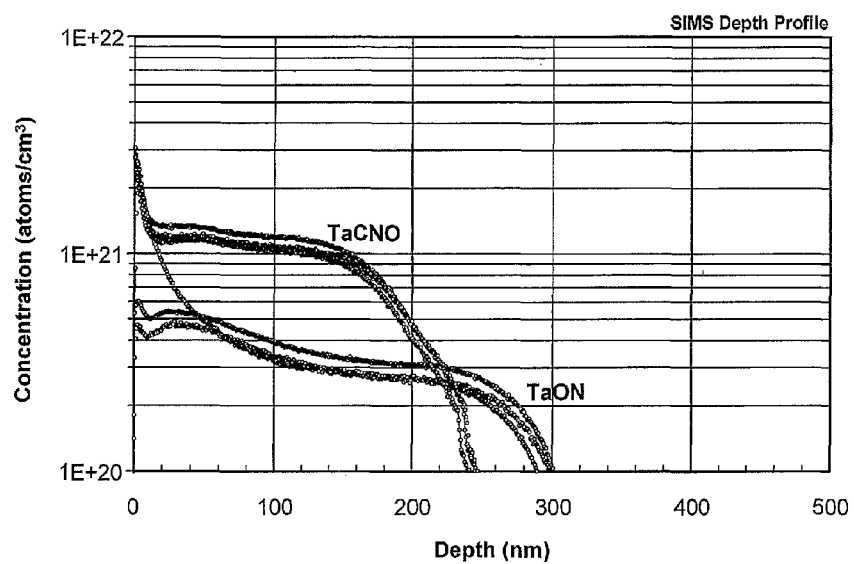
FIG. 10 shows results of SIMS (Secondary Ion Mass Spectrometry) measurement on Ta-containing materials.

FIG. 10 shows results of SIMS analysis carried out for the TaON and TaCNO thin films in the depth direction. The carbon content in the TaCNO was 1.5 to 1.0 at % (mol %), and the carbon content in the TaON was 0.5 to 0.3 at % (mol %), since 1×10²³ atoms/cm³ corresponds to about 100 at % (mol %). From this, it was found that the carbon content was greater in the TaCNO than in the TaON with a significant difference.

Figure 11:
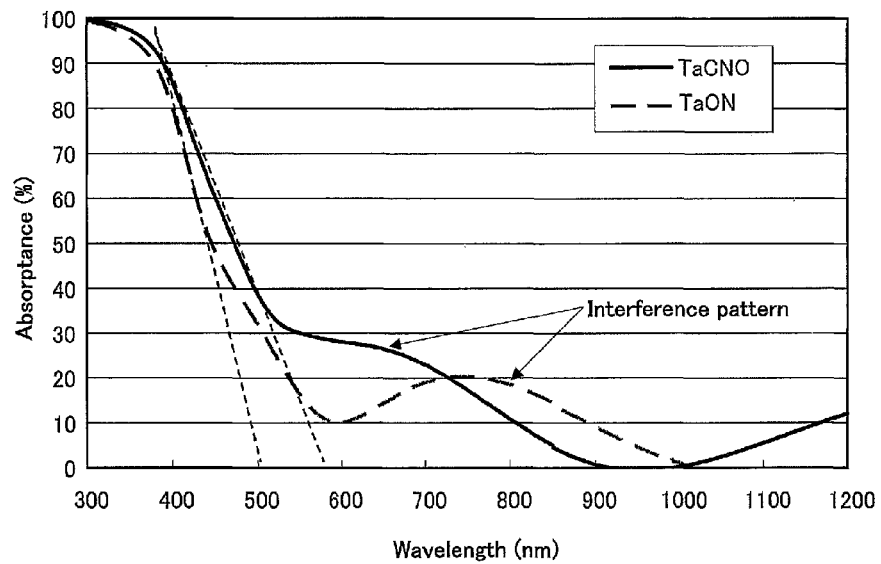
FIG. 11 shows the optical absorption characteristics of Ta-containing materials.

FIG. 11 shows results of measurements of the optical absorption characteristics of the TaON thin film and the TaCNO thin film formed on quartz substrates. Influence of interference patterns are seen in the curves. The tangent lines to the optical absorption curves are those drawn by neglecting the interference patterns. From the tangent lines, it was found that the bandgap wavelength of the TaON was 500 nm and the bandgap wavelength of the TaCNO was 580 nm, and thus that an 80 nm increase in bandgap wavelength is achieved by substitution of oxygen or nitrogen sites of TaON with 1.5 to 1.0 at % (mol %) of carbon.

A film of TaON and a film of TaCNO were formed on glassy carbon substrates by reactive sputtering under the same conditions as above, and the resultant products were used as working electrodes. Using the glassy carbon having conductivity as a current collector, the working electrodes were each connected by a lead to a platinum electrode serving as a counter electrode. Each pair of the working electrode and the counter electrode was immersed in a 0.1 M sulfuric acid aqueous solution, and the wavelength dependence of photocurrent was measured in a wavelength range of 900 nm to 300 nm by irradiating the TaON or TaCNO electrode with xenon lamp light dispersed by a prism. The maximum photocurrent was 2 µA/cm² at a wavelength of 400 nm. It was found that a photocurrent can be observed at a wavelength of 500 nm or less for the TaON and at a wavelength of about 600 nm or less for the TaCNO. The fact that a photocurrent was observed in the aqueous solution free from other substances than sulfuric acid indicates that water decomposition reaction took place. In order to confirm that these results were not due to dissolution reaction of the electrode, light irradiation was performed continuously for two weeks. During this period, there was no change in the photocurrent. Also, there was observed no change before and after the test in the results of the thin film X-ray diffraction measurement on the TaON and TaCNO. Oxides, nitrides, and oxynitrides of the Group 4 elements and Group 5 elements are more stable in acidic solutions than in alkaline solutions, and the metal elements are less soluble in acidic solutions than in alkaline solutions. Therefore, in view of durability, the semiconductor material of the present invention is desirably used in a neutral or acidic aqueous solution.

Example 2

A thin film of NbCNO (a semiconductor material in which oxygen or nitrogen sites of NbON are substituted with carbon) and a NbON thin film for comparison were formed on quartz substrates by reactive sputtering. The sputter deposition conditions are shown in Table 2.

TABLE 2

| Type of Film | Substrate | Target | Sputtering output (W) | Flow rate of Ar (Pa·m³/s) | Flow rate of O₂ (Pa·m³/s) | Flow rate of N₂ (Pa·m³/s) | Total pressure (Pa) | Substrate temperature (°C.) | Deposition time (hr) | Film thickness (nm) |
|---|---|---|---|---|---|---|---|---|---|---|
| NbON | Quartz | NbN | 30 | 6.1 × 10⁻⁴ (3.6 sccm) | 6.8 × 10⁻⁵ (0.4 sccm) | 2.4 × 10⁻³ (14.3 sccm) | 0.5 | 300 | 8 | 100 |
| NbCNO | Quartz | NbC | 30 | 6.1 × 10⁻⁴ (3.6 sccm) | 5.1 × 10⁻⁵ (0.3 sccm) | 2.4 × 10⁻³ (14.3 sccm) | 0.5 | 300 | 8 | 120 |

For the case of NbCNO, the Nb oxide was easily formed when the substrate temperature was increased up to a temperature that allows sufficient crystallization. Therefore, the substrate temperature was set to 300° C. Auger electron spectroscopy analysis was carried out for the NbON thin film and the NbCNO thin film in the depth direction. In both the NbON and NbCNO, the ratio of Nb oxygen:nitrogen was 33 to 36 at %:33 to 35 at %:32 to 34 at %. In the case of ideal NbON, the ratio of Nb:oxygen:nitrogen must be 33.3 at %:33.3 at %:33.3 at %. Therefore, it was found that almost single-phase NbON and NbCNO thin films were synthesized. Since analysis of trace carbon by Auger electron spectroscopy is difficult, the quantification of carbon was performed by another type of measurement.

Figure 12:
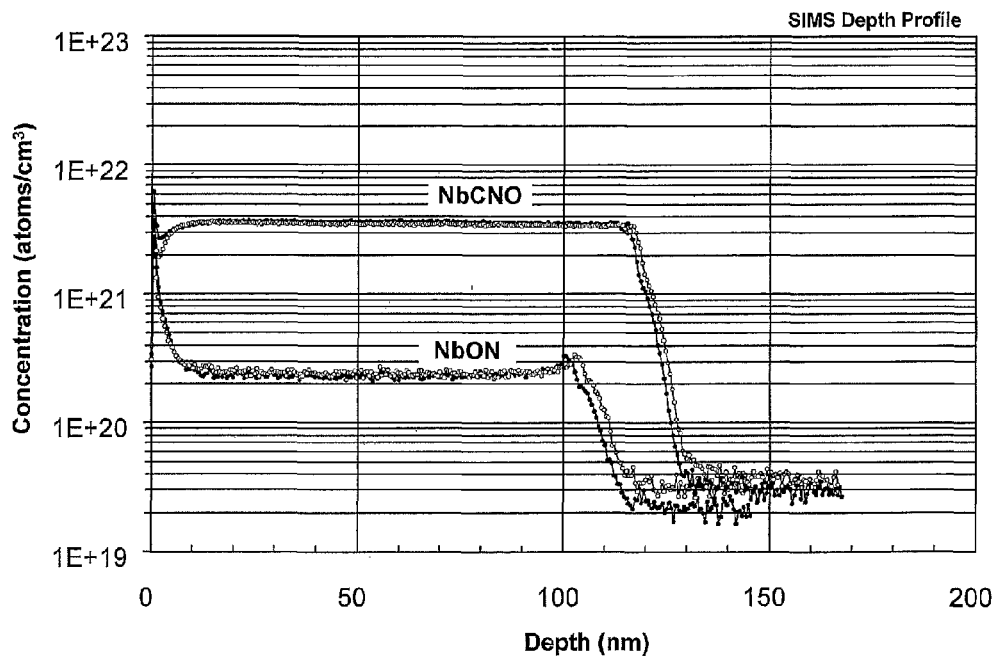
FIG. 12 shows results of SIMS measurement on Nb-containing materials.

FIG. 12 shows results of SIMS analysis carried out for the NbON and NbCNO thin films in the depth direction. The carbon content in the NbCNO was about 3.5 at % (mol %), and the carbon content in the NbON was about 0.25 at % (mol %), since $1\times10^{23}$ atoms/cm$^3$ corresponds to about 100 at % (mol %). From this, it was found that the carbon content is greater in NbCNO than in NbON with a significant difference.

Figure 13:
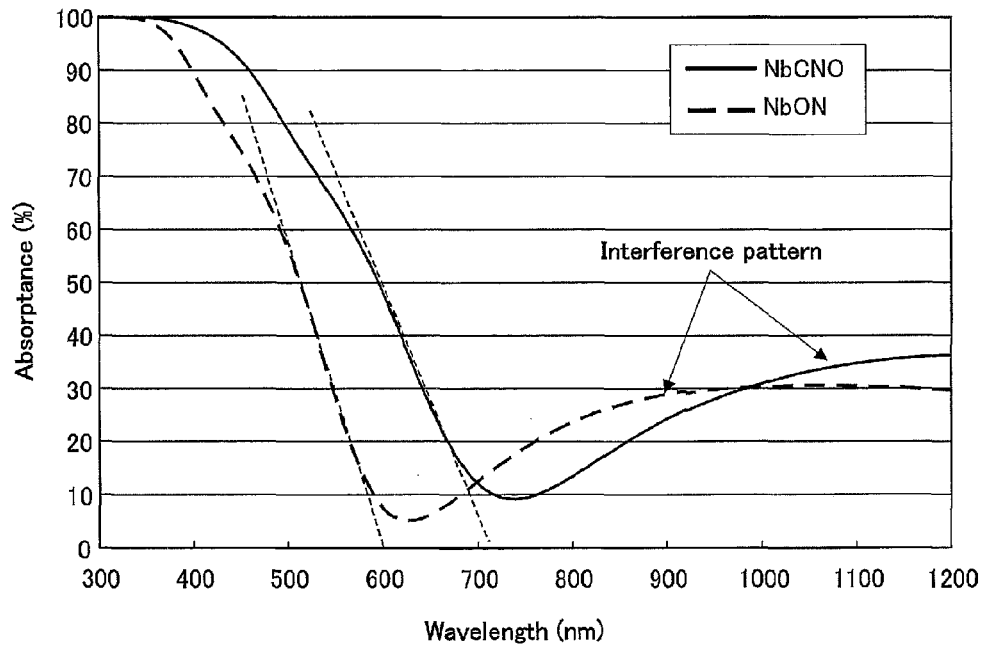
FIG. 13 shows the optical absorption characteristics of Nb-containing materials.

FIG. 13 shows results of measurements of the optical absorption characteristics of the NbON thin film and the NbCNO thin film formed on quartz substrates. Influence of interference patterns are seen in the curves. The tangent lines to the optical absorption curves are those drawn by neglecting the interference patterns. From the tangent lines, it was found that the bandgap wavelength of the NbON was 600 nm and the bandgap wavelength of the NbCNO was 720 nm, and thus that a 120 nm increase in bandgap wavelength is achieved by substitution of oxygen or nitrogen sites of NbON with about 3.5 at % (mol %) of carbon.

A film of NbON and a film of NbCNO were formed on glassy carbon substrates by reactive sputtering under the same conditions as above, and the resultant products were used as working electrodes. Using the glassy carbon having conductivity as a current collector, the working electrodes were each connected by a lead to a platinum electrode serving as a counter electrode. Each pair of the working electrode and the counter electrode was immersed in a 0.1 M sulfuric acid aqueous solution, and the wavelength dependence of photocurrent was measured in a wavelength range of 900 nm to 300 nm by irradiating the NbON or NbCNO electrode with xenon lamp light dispersed by a prism. The maximum photocurrent was 11 µA/cm$^2$ at a wavelength of 450 nm. It was found that a photocurrent can be observed at a wavelength of 600 nm or less for NbON and at a wavelength of about 720 nm or less for NbCNO. The fact that a photocurrent was observed in the aqueous solution free from other substances than sulfuric acid indicates that water decomposition reaction took place. In order to confirm that these results were not due to dissolution reaction of the electrode, light irradiation was performed continuously for two weeks. During this period, there was no change in the photocurrent.

Example 3

In order to confirm that the main phase of the NbON and NbCNO described in Example 2 was monoclinic NbON, a NbON thin film was fabricated on a quartz substrate by reactive sputtering with a reduced sputtering output at a reduced deposition rate. The sputter deposition conditions are shown in Table 3.

Figure 14:
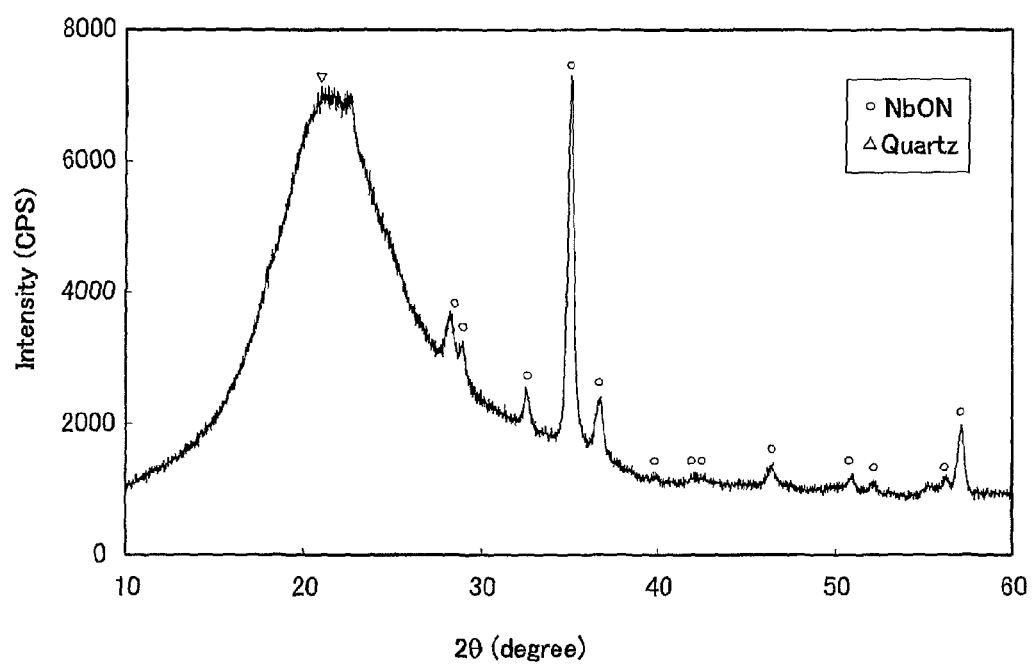
FIG. 14 shows a result of thin film X-ray diffraction measurement on a Nb-containing material.

NbON is an unknown material, and no example of successful single-phase synthesis of NbON has been reported in the past. Thus, reference data for X-ray diffraction of NbON is not available. Therefore, the lattice constant of NbON was calculated by assuming that NbON has the same monoclinic crystal structure as TaON, placing a Nb atom at the same coordinate as Ta of TaON, and optimizing the structure by a first-principles calculation. For confirmation, the lattice constant of TaON was also calculated by optimizing the structure by a first-principles calculation using the known crystal structure of TaON. The result was well matched to the lattice constant previously reported in a X-ray diffraction database. Generally, crystal lattice constants can be calculated by first-principles calculations with good accuracy. FIG. 14 shows a thin film X-ray diffraction pattern of the NbON thin film fabricated by reactive sputtering using oxygen and nitrogen gases and using NbN as a sputtering target. It was confirmed that an almost single-phase NbON thin film was obtained, except for a halo peak of quartz of the substrate.

A film of NbON was formed on a glassy carbon substrate by reactive sputtering under the same conditions as above, and the resultant product was used as a working electrode. Using the glassy carbon having conductivity as a current collector, the working electrode was connected by a lead to a platinum electrode serving as a counter electrode. The working electrode and the counter electrode were immersed in a 0.1 M sulfuric acid aqueous solution, and the wavelength dependence of photocurrent was measured in a range of 900 nm to 300 nm by irradiating the NbON electrode with xenon lamp light dispersed by a prism. The maximum photocurrent was 20 µA/cm$^2$ at a wavelength of 450 nm. It was found that a photocurrent can be observed at a wavelength of 600 nm or less for NbON. The fact that a photocurrent was observed in the aqueous solution free from other substances than sulfuric acid indicates that water decomposition reaction took place. In order to confirm that these results were not due to dissolution reaction of the electrode, light irradiation was performed continuously for two weeks. During this period, there was no change in the photocurrent.

In the present examples, reactive sputtering using TaC as a target was used for fabrication of TaCNO, and reactive sputtering using NbC as a target was used for fabrication of NbCNO. However, TaCNO and NbCNO may be fabricated by other commonly-known thin film production methods such as sputtering, MOCVD, and plasma CVD. Alternatively, a method may be employed in which carbon is implanted into preliminarily-fabricated TaON thin film and NbON thin film by a commonly-known method such as carbon ion implantation so as to obtain TaCNO and NbCNO. In the case of simple ion implantation, carbon is present in the form of a dopant. Therefore, for example, it is preferable that oxygen or nitrogen sites be substituted with carbon by a method such as a thermal diffusion process performed in a nitrogen atmosphere, an ammonia atmosphere or the like from which impurities such as oxygen and water have been

TABLE 3

| Type of Film | Substrate | Target | Sputtering output (W) | Flow rate of Ar (Pa · m$^3$/s) | Flow rate of O$_2$ (Pa · m$^3$/s) | Flow rate of N$_2$ (Pa · m$^3$/s) | Total pressure (Pa) | Substrate temperature (° C.) | Deposition time (hr) | Film thickness (nm) |
|---|---|---|---|---|---|---|---|---|---|---|
| NbON | Quartz | NbN | 20 | 6.1 × 10$^{-4}$ (3.6 sccm) | 6.8 × 10$^{-5}$ (0.4 sccm) | 2.4 × 10$^{-3}$ (14.3 sccm) | 0.5 | 700 | 8 | 100 | sufficiently removed. In the thermal diffusion process, the shortest thermal treatment time settable by the apparatus used may be sufficient as long as the temperature is increased up to a minimum temperature required for crystallization of the material used.

In the semiconductor material, the carbon content is not particularly limited as long as the semiconductor function is not impaired by change in the crystal structure of the oxynitride. From a result of a first-principles calculation, it was found that the preferred carbon content is 8.3 at % (mol %) or less, although depending on which sites are substituted with carbon. From a result of a first-principles calculations, it was found that the band gap can be adjusted by controlling the amount of carbon substituting for oxygen or nitrogen to be 8.3 at % or less. It was found that the electronic state in the d orbitals constituting the conduction band is hardly affected by the carbon substitution. Furthermore, it was found that the valence band levels can be controlled by controlling the amount of carbon substituting for oxygen or nitrogen sites. For example, when a n-type semiconductor having a photocatalytic function is used for water decomposition reaction induced by sunlight, the difference between the top of the valence band levels and the oxygen evolution level corresponds to an overpotential in an electrochemical reaction such as water electrolysis. In water decomposition reaction, oxygen evolution generally acts as a rate-limiting factor. Therefore, the oxygen evolution overpotential can be controlled by controlling the substitutional carbon amount and thereby controlling the valence band levels. When the oxygen evolution overpotential is small (the top of the valence band levels is high), the magnitude of the photocurrent per unit electrode area cannot be made larger. Therefore, in the case of use in a device, the electrode surface area needs to be increased to obtain a large amount of photocurrent. However, depending on the electrode fabrication process, the increase in the surface area of the electrode may be limited. Therefore, in order to increase sufficiently the photocurrent per apparent unit electrode area when the electrode has a surface area limited by the electrode fabrication process for the device, it is recommended to control the amount of carbon substituting for oxygen or nitrogen sites. In the case where it is advantageous to ensure an appropriate oxygen evolution overpotential in terms of device configuration, band design may be performed for the valence band levels by controlling the amount of substitutional carbon, even when the control of the amount of carbon makes the valence band levels deeper, resulting in an increase in the band gap and thereby slight deterioration in sunlight utilization efficiency.

In addition, from a result of a first-principles calculation, it was found that the properties of a semiconductor having a band gap are exhibited when the Group 5 element is in a form having a valence of 5 which is the highest possible valence, and that when the Group 5 element is in a form having a smaller valence than the highest valence, electron density in the conduction band is increased, and thus no evident band gap occurs. Therefore, in the semiconductor material of the present invention, it is preferable that the Group 5 element be in a form having substantially a valence of 5 (preferably a valence of 4.8 to 5). In addition, it is desirable that the Group 4 element be in a form having substantially a valence of 4 (preferably 3.8 to 4). The reason for this is as follows. In the case of Nb, for example, the conduction band is composed of the Nb d orbitals, and therefore, Nb is desirably in the pentavalent form in which the d orbital is empty of electrons. By a first-principles calculation, it was found that when Nb is in the trivalent form in which electrons are present in the d orbital, metallic conductivity is exhibited and no band gap occurs due to the presence of electrons in the conduction band. However, there may be a case where the Group 5 element is in a form having a valence of about 4.8 because of an inevitable production defect or the like. In this case, a defect level is formed due to the defect, a phenomenon in which a broad absorption edge is observed occurs, and the efficiency of absorption for wavelengths around the band gap wavelength is somewhat decreased. However, there is no significant influence on the semiconductor properties. Therefore, in the present invention, it is acceptable that the valence of the Group 5 element is decreased to about 4.8 due to an inevitable production defect. In other words, "that the Group 5 element be in a form having substantially a valence of 5" means that the Group 5 element is allowed to have a valence close to but less than 5 as long as there is no significant influence on the semiconductor properties, and that the Group 5 element is preferably in a form having a valence of 4.8 to 5. Also, "that the Group 4 element be in a form having substantially a valence of 4" means that the Group 4 element is allowed to have a valence close to but less than 4 as long as there is no significant influence on the semiconductor properties, and that the Group 4 element is preferably in a form having a valence of 3.8 to 4.

In the present examples given above, oxygen or nitrogen sites of an oxynitride of a Group 5 element are substituted with carbon. However, it was also found that the effect of increasing the bandgap wavelength can be similarly obtained also when oxygen or nitrogen sites of an oxynitride such as $Zr_2ON_2$ or $Ti_2ON_2$ which includes a tetravalent central metal element selected from the Group 4 elements are substituted with carbon. Also in the case where oxygen or nitrogen sites of $Zr_2ON_2$ or $Ti_2ON_2$ are substituted with carbon, the resultant material is allowed to be in an amorphous form as long as the material has a single-phase structure. When in a crystalline form, the material desirably has a cubic structure.

INDUSTRIAL APPLICABILITY

With the semiconductor material of the present invention, hydrogen can be generated with high efficiency using sunlight. The obtained hydrogen can be used, for example, as fuel for fuel cells.

The invention claimed is:

1. A semiconductor material comprising metal oxynitride comprising a Group 5 element, which is Nb and is in a form having substantially a valence of 5,
   wherein in the metal oxynitride, a carbon atom is present at least one site selected from the group consisting of an oxygen site and a nitrogen site in a corresponding unsubstituted metal oxynitride,
   the semiconductor material has a single-phase structure and a monoclinic crystal structure,
   the semiconductor material has a photocatalytic ability, and
   a carbon content in the metal oxynitride is in a range of 8.3 at % or less.

2. The semiconductor material according to claim 1,
   wherein the Nb is in a form having the valence in a range from 4.8 to 5.

3. A method of producing hydrogen, comprising steps of:
   immersing the semiconductor material according to claim 1 in a solution containing an electrolyte and water; and then irradiating the semiconductor material with light to decompose the water.

4. An optical hydrogen generating device comprising:
a container;
an electrode including a photocatalytic material; and
a counter electrode,
wherein the photocatalytic material comprises the semiconductor material according to claim 1.

* * * * *